United States Patent
Guld et al.

(10) Patent No.: US 10,824,294 B2
(45) Date of Patent: Nov. 3, 2020

(54) THREE-DIMENSIONAL RESOURCE INTEGRATION SYSTEM

(71) Applicant: MICROSOFT TECHNOLOGY LICENSING, LLC, Redmond, WA (US)

(72) Inventors: Enrico William Guld, North Vancouver (CA); Jason A. Carter, Edmonds, WA (US); Heather Joanne Alekson, Vancouver (CA); Andrew Jackson Klein, Vancouver (CA); David J. W. Seymour, Burnaby (CA); Kathleen P. Mulcahy, Seattle, WA (US); Charla M. Pereira, Vancouver (CA); Evan Lewis Jones, Kirkland, WA (US); William Axel Olsen, Vancouver (CA); Adam Roy Mitchell, Kirkland, WA (US); Daniel Lee Osborn, Woodinville, WA (US); Zachary D. Wiesnoski, Seattle, WA (US); Struan Andrew Robertson, Sammamish, WA (US); Michael Edward Harnisch, Seattle, WA (US); William Robert Schnurr, Vancouver (CA); Helen Joan Hem Lam, Vancouver (CA); Darren Alexander Bennett, Vancouver (CA); Kin Hang Chu, Burnaby (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 88 days.

(21) Appl. No.: 15/597,058

(22) Filed: May 16, 2017

(65) Prior Publication Data

US 2018/0113597 A1 Apr. 26, 2018

Related U.S. Application Data

(60) Provisional application No. 62/412,782, filed on Oct. 25, 2016.

(51) Int. Cl.
*G06F 3/048* (2013.01)
*G06F 3/0481* (2013.01)
(Continued)

(52) U.S. Cl.
CPC .......... *G06F 3/04815* (2013.01); *G06F 3/011* (2013.01); *G06F 3/0486* (2013.01); *G06F 3/04817* (2013.01)

(58) Field of Classification Search
CPC ............. G06F 3/04815; G06F 3/04817; G06F 3/0486; G06F 3/011
See application file for complete search history.

(56) References Cited

U.S. PATENT DOCUMENTS 7,631,277 B1 * 12/2009 Nie ..................... G06T 15/205
345/419
8,010,474 B1 * 8/2011 Bill ........................ A63F 13/12
706/46

(Continued)

OTHER PUBLICATIONS

Regenbrecht, et al., "Interaction in a collaborative augmented reality environment", In Extended Abstracts on Human Factors in Computing Systems, Apr. 20, 2002, pp. 504-505.
(Continued)

*Primary Examiner* — Thu V Huynh
(74) *Attorney, Agent, or Firm* — Shook, Hardy & Bacon L.L.P.

(57) ABSTRACT

Various methods and systems, for implementing three-dimensional resource integration, are provided. 3D resource integration includes integration of 3D resources into different types of functionality, such as, operating system, file
(Continued)

explorer, application and augmented reality functionality. In operation, an indication to perform an operation with a 3D object is received. One or more 3D resource controls, associated with the operation, are accessed. The 3D resource control is a defined set of instructions on how to integrate 3D resources with 3D objects for generating 3D-based graphical interfaces associated with application features and operating system features. An input based on one or more control elements of the one or more 3D resource controls is received. The input includes the one or more control elements that operate to generate a 3D-based graphical interface for the operation. Based on receiving the input, the operation is executed with the 3D object and the 3D-based graphical interface.

20 Claims, 23 Drawing Sheets

(51) Int. Cl.
  *G06F 3/0486* (2013.01)
  *G06F 3/01* (2006.01)

(56) References Cited

U.S. PATENT DOCUMENTS

| | | | | |
|---|---|---|---|---|
| 9,086,785 | B2* | 7/2015 | Chaudhri | G06F 3/0483 |
| 9,658,732 | B2* | 5/2017 | Ording | G06F 3/0481 |
| 2001/0016806 | A1 | 8/2001 | Ronen | |
| 2004/0135820 | A1* | 7/2004 | Deaton | G06F 3/04815 |
| | | | | 715/848 |
| 2008/0059570 | A1* | 3/2008 | Bill | G06Q 10/10 |
| | | | | 709/203 |
| 2009/0113349 | A1* | 4/2009 | Zohar | G06Q 30/00 |
| | | | | 715/852 |
| 2009/0278917 | A1 | 11/2009 | Dobbins et al. | |
| 2011/0169927 | A1 | 7/2011 | Mages et al. | |
| 2011/0294467 | A1* | 12/2011 | Kim | G06F 1/1643 |
| | | | | 455/411 |
| 2013/0125029 | A1* | 5/2013 | Miller | G06F 9/45529 |
| | | | | 715/760 |
| 2015/0227285 | A1* | 8/2015 | Lee | G06F 3/04817 |
| | | | | 715/765 |
| 2015/0293666 | A1* | 10/2015 | Lee | G06F 3/04815 |
| | | | | 715/849 |
| 2016/0027216 | A1 | 1/2016 | da veiga et al. | |
| 2016/0196155 | A1 | 7/2016 | Jacobson et al. | |
| 2017/0199855 | A1* | 7/2017 | Fishbeck | G06F 17/241 |

OTHER PUBLICATIONS

Liarokapis, Fotis, "An Augmented Reality Interface for Visualizing and Interacting with Virtual Content", In Journal of Virtual Reality, vol. 11, No. 1, Mar. 2007, 18 pages.

Wang, et al., "Coordinated 3D interaction in tablet- and HMD-based hybrid virtual environments", In Proceedings of the 2nd ACM symposium on Spatial user interaction, Oct. 4, 2014, pp. 70-79.

Bendels, et al., "Towards the next generation of 3D content creation", In Proceedings of the working conference on Advanced visual interfaces, May 25, 2004,, pp. 283-289.

Krichenbauer, et al., "Towards Augmented Reality User Interfaces in 3D Media Production", In Proceedings of IEEE International Symposium on Mixed and Augmented Reality, Sep. 10, 2014, 6 pages.

Deering, Michael F., "HoloSketch: a virtual reality sketching/animation tool", In Journal of ACM Transactions on Computer-Human Interaction (TOCHI)—Special issue on virtual reality software and technology, vol. 2 Issue 3, Sep. 1995, pp. 220-238.

Lee, et al., "Fast and Accurate 3D Selection using Proxy with Spatial Relationship for Immersive Virtual Environments", In Proceedings of the 2016 Symposium on Spatial User Interaction, Oct. 15, 2016, 209 pages.

Thalmann, Daniel, "Using Virtual Reality Techniques in the Animation Process", In Proceedings of Virtual Reality Systems, British Computer Society, 1993, pp. 1-20.

Benko, et al., "NormalTouch and TextureTouch High-fidelity 3D Haptic Shape Rendering on Handheld Virtual Reality Controllers", In Proceedings of the 29th Annual Symposium on User Interface Software and Technology, Oct. 16, 2016, pp. 717-728.

* cited by examiner

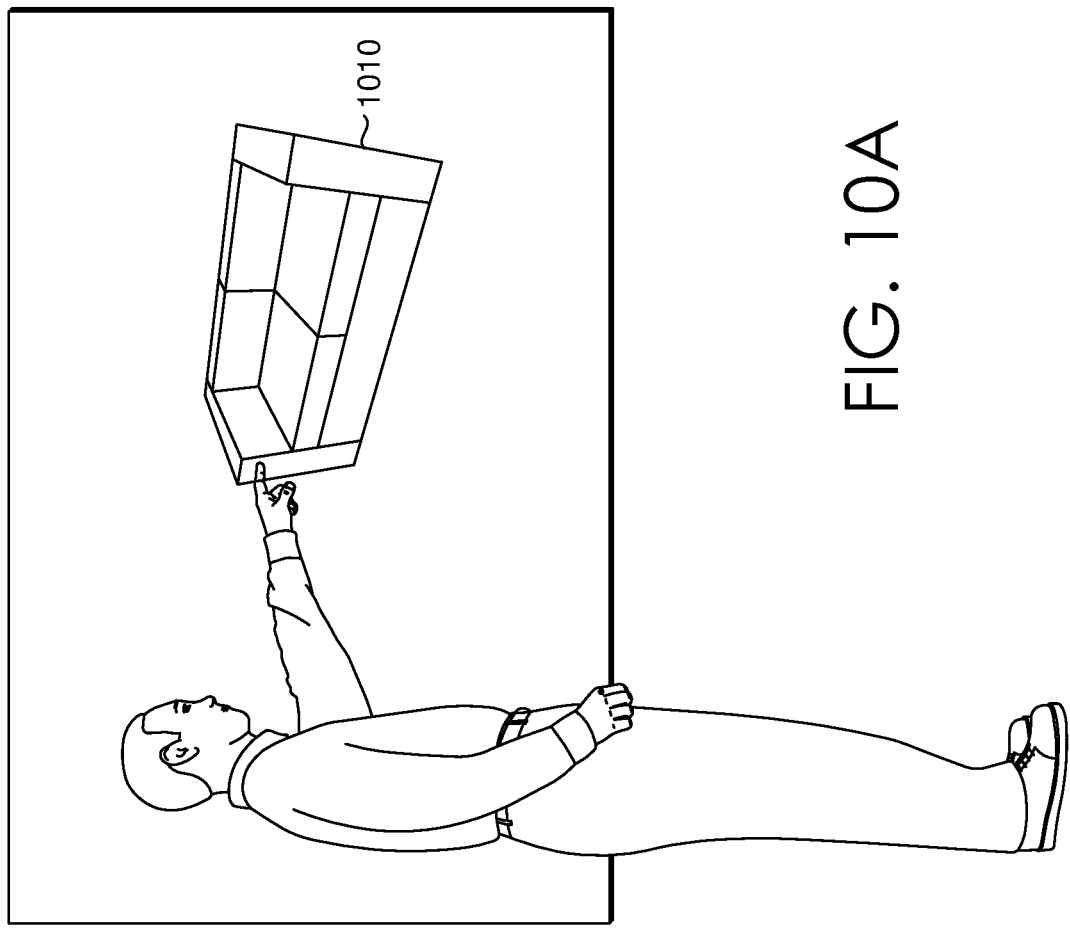

THREE-DIMENSIONAL RESOURCE INTEGRATION SYSTEM

CROSS-REFERENCE TO RELATED APPLICATIONS

This application claims the benefit of U.S. Provisional Application No. 62/412,782, filed Oct. 25, 2016, entitled "THREE-DIMENSIONAL RESOURCE INTEGRATED SYSTEM," the benefit priority of which is hereby claimed, and which is incorporated herein by reference in its entirety.

BACKGROUND

An operating system is generally responsible for managing computer hardware and software for providing common services to computing applications. An operating system can, for example, provide access to data stored in association with the operating system. The operating system can also support, using common services, different applications that access stored data and perform coordinated functions, tasks and other activities. Innovations in computing technology have developed new types of computing objects and corresponding computing functionality and features to be managed by an operating system and integrated into existing applications in different ways. In particular, three-dimensional (3D) objects (e.g., virtual objects or augmented reality objects) that are representations of geometric data can be integrated into an operating system, applications, and other computing operations to provide improved visualization of different types of user activities and tasks.

SUMMARY

Embodiments of the present invention are directed to a three-dimensional (3D) resource integration system. The 3D resource integration system can refer to a set of Application Programming Interfaces that allow for the integration of 3D resources into an operating system (OS) and applications. The 3D resource integration system can support integration of 3D resources into different types of functionality, such as, operating system functionality, file explorer functionality, application functionality, and augmented reality functionality. The 3D resources can be used to generate more interactive and visually stimulating graphical interfaces. The 3D resources can also seamlessly operate with existing features and applications, leveraging existing functionality, while specifically introducing 3D objects and features. The 3D integration system includes a 3D content store that operates with a file explorer, integrated 3D resource controls, and application and operating system features. The 3D integration system advantageously operates with an operating system and applications running on the OS. The integrated 3D resource controls can be selectively integrated into different applications and OS features to support corresponding functionality. It is contemplated that the integrated 3D resource controls can also be independently implemented in other contexts. The integrated 3D resource controls can be built on APIs and implemented as software components that allow for user interaction with 3D objects and functionality.

In operation, an indication can be received to perform an operation associated with a 3D object. A 3D resource control associated with the operation is accessed to support performing the operation; the 3D resource control is a control defined using a 3D resource integration system. An input is received using one or more control elements of the 3D resource control. Based on receiving the input, executing the operation with the 3D object associated with the operation and the 3D resource control. In one embodiment, the 3D resource control is a file explorer 3D resource control with one or more control elements and operates to generate a 3D-based graphical interface (e.g., a file explorer control interface) for accessing 3D objects via an application or an operating system. The file explorer 3D resource control with the one or more control elements further operates to generate a selectable icon for an augmented reality control for transitioning to an augmenting reality view interface.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein:

FIGS. 10A-10B are an illustration of a 3D resource control supporting presentation mode of an application, in accordance with embodiments of the present invention;

DETAILED DESCRIPTION

Figure 1:
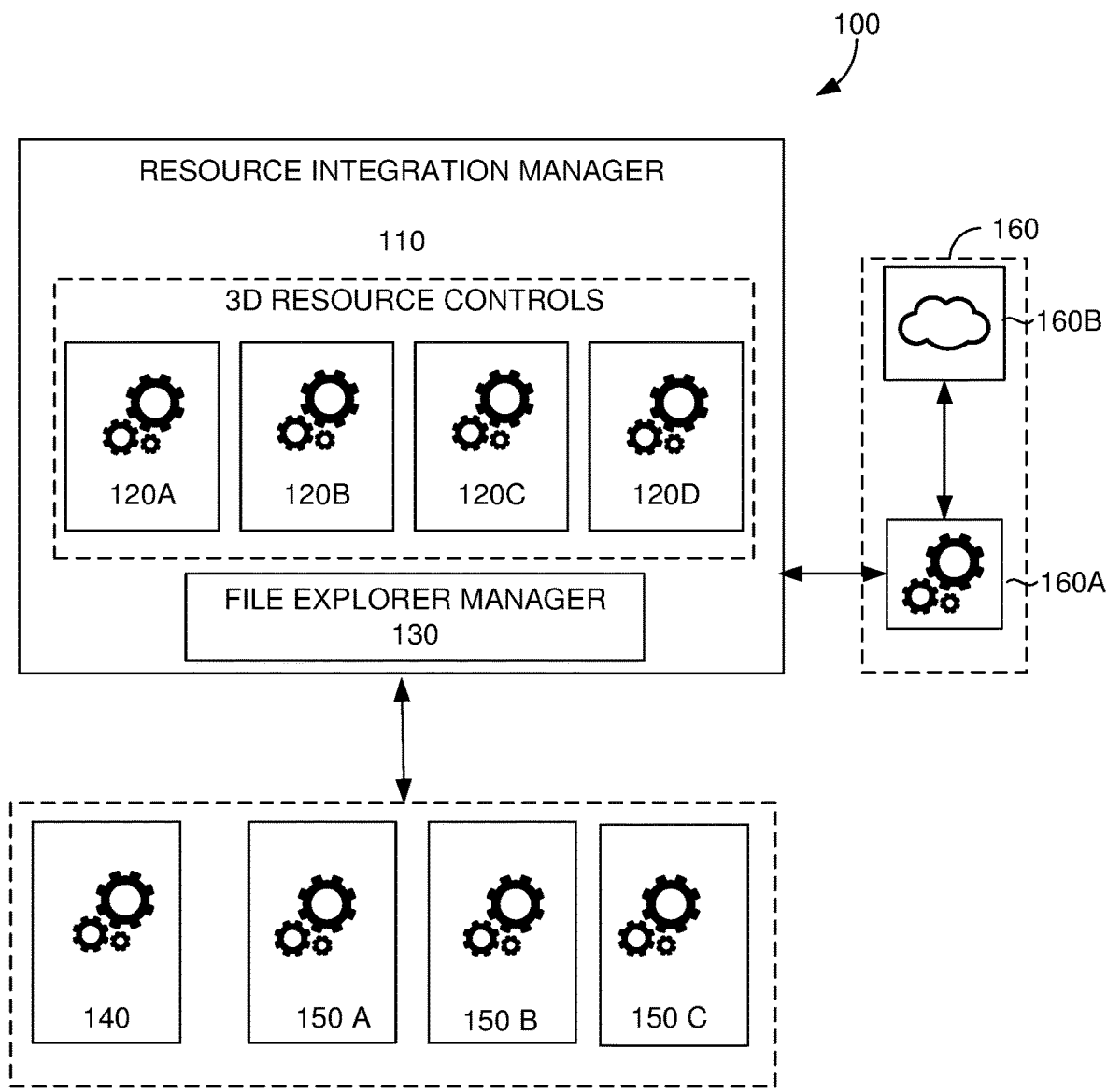
FIG. 1 is a schematic showing an exemplary 3D resource integration system, in accordance with embodiments of the present invention.

Computing systems support performing different types of tasks based on computing components. An operating system is generally responsible for managing computer hardware and software for providing common service to computing applications. An operating system can, for example, provide access to data stored in association with the operating system. The operating system can also support, using common services, applications that access stored data and perform coordinated functions, tasks and other activities. Innovations in computing technology have developed new types of computing objects and corresponding computing functionality and features to be managed by an operating system and integrated into existing applications in different ways. In particular, three-dimensional (3D) objects (e.g., virtual object or augmented reality objects) that are representations of geometric data can be integrated into an operating system, applications, and other computing operations to provide improved visualization of different types of user activities and tasks.

Embodiments of the present invention provide simple and efficient methods for providing a three-dimensional (3D) resource integration system. The 3D resource integration system can refer to a set of Application Programming Interfaces that allow for the integration of 3D resources into an operating system and applications. The 3D resource integration system can support integration of 3D resources into different types of functionality, such as, operating system functionality, file explorer functionality, application functionality, and augmented reality functionality. The 3D resources can be used to generate more interactive and visually stimulating graphical interfaces. The 3D resources can also seamlessly operate with existing features and applications leveraging existing functionality while specifically introducing 3D objects and features. The 3D integration system includes a 3D content store that operates with a file explorer, integrated 3D resource controls, and application and operating system features. The 3D integration system advantageously operates with an operating system and applications running on the operating system. The integrated 3D resource controls can be selectively integrated into different applications and operating system features to support corresponding functionality. It is contemplated that the integrated 3D resource controls can also be independently implemented in other contexts. The integrated 3D resource controls can be built on APIs and implemented as software components that allow for user interaction with 3D objects and functionality.

In operation, an indication to perform an operation, associated with a 3D object, is received. One or more 3D resource controls, associated with the operation to support performing the operation, are accessed, from a 3D integration manager. The 3D resource control is a defined set of instructions on how to integrate 3D resources with 3D objects for generating 3D-based graphical interfaces associated with operations of application features and operating system features. An input based on one or more control elements of the one or more 3D resource controls is received, from the 3D integration manager. The input comprises the one or more control elements that operate to generate a 3D-based graphical interface for the operation. Based on receiving the input, executing the operation with the 3D object and the 3D-based graphical interface for the operation. The 3D resource control can specifically be a file explorer 3D resource control with one or more control elements and operates to generate a 3D-based graphical interface (e.g., a file explorer control interface) for accessing 3D objects via an application or an operating system. The file explorer 3D resource control with the one or more control elements further operates to generate a selectable icon for an augmented reality control for transitioning to an augmenting reality view interface.

Accordingly, three-dimensional (3D) objects (e.g., virtual objects or augmented reality objects) that are representations of geometric data can be integrated into an operating system, applications, and other computing operations to provide improved visualization of different types of user activities and tasks.

With reference to FIG. 1, embodiments of the present disclosure can be discussed with reference to an exemplary 3D resource integration system 100 that is an operating environment for implementing functionality described herein. The 3D resource integration system 100 includes a 3D resource integration manager 110 having a plurality of 3D resource controls 120A-120D and a file explorer manager 130, the system further includes an OS features manager 140 and a plurality of applications 150A-150C, and a 3D content store 160 having a local store 160A and a cloud store 160B. The 3D resource integration system 100 can operate on a computing device or a head mounted display device. The computing device may include any type of computing device described below with reference to FIG. 15, and the HMD may include any type of HMD or augmented reality device described below with reference to FIGS. 13 and 14.

For detailed discussion purposes, the augmented reality device is an exemplary head mounted display (HMD) device, but other types of augmented reality devices are contemplated with embodiments of the present disclosure. The HMD is a scene-aware device that understands elements surrounding a real world environment and generates virtual objects to display as augmented reality images to a user. HMD can be configured to capture the real world environment based on components of the HMD. The HMD can include a depth camera and sensors that support understanding elements of a scene or environment, for example, generating a 3-D mesh representation of a real world environment. The HMD can also include an augmented reality emitter for projecting virtual objects or images in the real world based at least in part of the 3-D mesh representation. In this regard, the HMD can specifically include functionality (e.g., augmented reality or mixed-reality experiences) that can be supported using the mixed-input pointing device 120 operating based on the 3D resource integration system 100 mechanism or manager 110.

A mechanism as used herein refers to any device, process, or service or combination thereof. A mechanism may be implemented using components as hardware, software, firmware, a special-purpose device, or any combination thereof. A mechanism may be integrated into a single device or it may be distributed over multiple devices. The various components of a mechanism may be co-located or distributed. The mechanism may be formed from other mechanisms and components thereof. The components of the 3D resource integration mechanism facilitate providing 3D resource integration.

With continued reference to FIG. 1, the 3D resource integration manager 110 is responsible for providing access to the plurality of 3D resource controls 120A-120D and a file explorer manager 130. A selected resource control can be implemented on one or more applications or via the operating systems to support particular application and operating system features. The 3D resource control can be provided through the 3D resource integration manager 110 via messages for corresponding applications or operating system to access and utilize a 3D resource control. For example, an application may want to access a 3D object and as such a file explorer can be launched via the application based at least in part on the 3D resource integration manager.

A file explorer (e.g., a file explorer control interface) is provided based on a file explorer manager 130 that provides access to a 3D content store 160 having a local store 160A and a cloud store 160B. The file explorer manager 130 can operate with applications and the operating system to provide the file explorer as a 3D resource control (i.e., a file explorer 3D resource control) for access to 3D objects. Several different applications can access 3D objects in the 3D content store 160 through the file explorer 3D resource control that is integrated into the application. For example, a document-authoring and presentation-authoring application can include the file explorer 3D resource control added as a modular interface for accessing 3D objects in different ways supported by the file explorer.

The file explorer 3D resource control can include different types of control elements and graphical user interaction elements to support an intuitive way of accessing 3D objects (e.g., a file explorer control interface). In particular, the file explorer 3D resource control can present 3D objects based on the particular attributes of the 3D object or application accessing the 3D object. For example, at least partial rotation or animation of a selected 3D object can be performed directly from the file explorer. In this regard, a user can have the necessary information needed to make a selection. Further, traditional drag and drop functionality can be implemented for dragging and dropping 3D objects into directly into applications. The drag and drop operations can further include an animation across the desktop during the drag and drop; the animations can leverage the 3D object attributes. The file explorer 3D resource control can further be integrated with other 3D resource controls to provide functionality directly from the file explorer. By way of example, the file explorer 3D resource control may incorporate, by way of a button or selectable icon, an augmented reality viewer control that can facilitate transitioning from selecting a 3D object into an augmented reality viewer control interface having the selected 3D object being viewed as a hologram in the real world.

It is contemplated that applications and the file explorer may integrate the 3D resource controls in other ways and not limited to directly querying the 3D resource control integration manager 110. For example, an application may access and provide a graphical user interface control (e.g., application ribbon) automatically upon launching to support the 3D resource control via the application. Other variations and combinations of accessing, integration, launching, and executing 3D resource controls are contemplated with embodiments described herein.

The operating system features manager is responsible for managing operating system features that are implemented using the 3D resource integration system 100. In particular, operating system features can integrate 3D resource controls and the file explorer resource control into functionality of the operating system that previously operated without 3D objects. For example, a lock screen feature associated with an operating system can integrate a 3D object as part of the lock screen and further integrate the 3D object into lock screen functionality. Another operating system feature can be a desktop background that can be implemented as a 3D object. The 3D object can be part of a personalization control interface that has been adapted to provide support to selecting (e.g., via the file explorer control interface) and implementing 3D objects as desktop background. Additional attributes of the 3D object (e.g., animation, rotation etc.) are configurable to provide enhanced desktop backgrounds. For example, a background scene that animates from dusk to dawn can be aligned to the time of the day such that the 3D object animation is in sync with the time of day. Other variations and combination of operating system features are contemplated with embodiments of the present disclosure.

Figure 2:
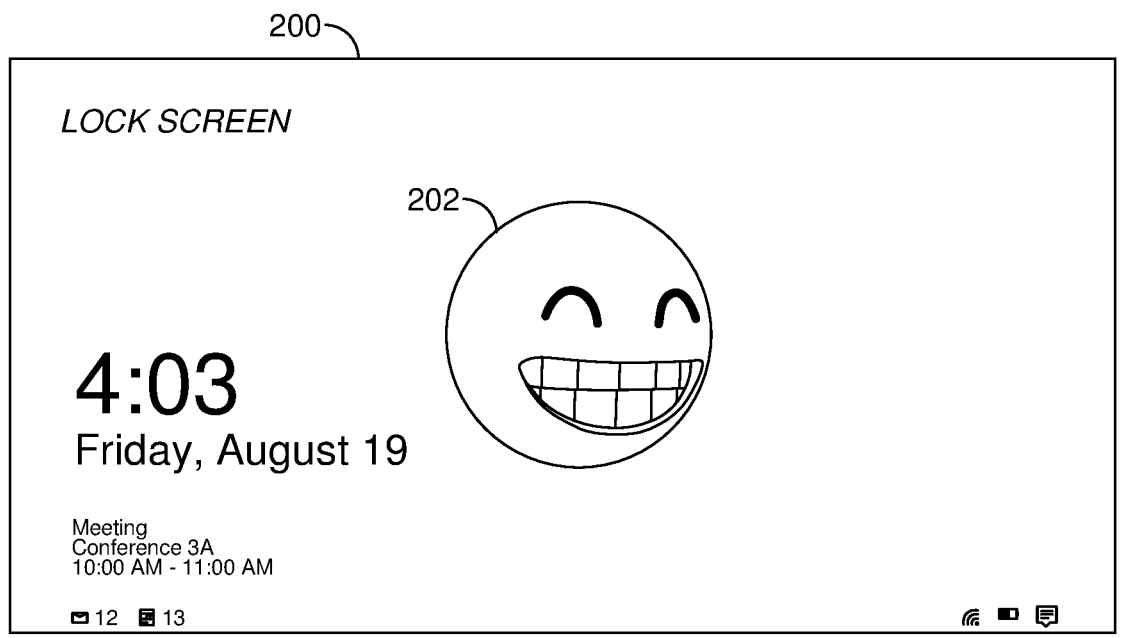
FIG. 2 is an illustration of a lock screen with an animated 3D object, in accordance with embodiments of the present invention.

With reference to FIGS. 2-11, several illustrations of exemplary implementations of a 3D resource integration system, in accordance with embodiments of the present disclosure, are provided. The 3D objects and 3D resource controls are implemented on operating system features, file explorer and applications using the 3D resource integration manager. Turning to FIG. 2, FIG. 2 is an illustration of a lock screen 200 that incorporates a 3D object 202. The 3D object can have predefined animations that are performed. The 3D object can be animated based on user interaction and actions at the lock screen. The 3D object can be a portion of the lock screen and displayed in combination with other elements of the lock screen. The 3D object can be an avatar. In particular, the 3D object can be an avatar representing a digital personal assistant. As such, it is further contemplated that digital personal assistant queries and operations can be performed based on interactions with the avatar at the lock screen.

Figure 3A:
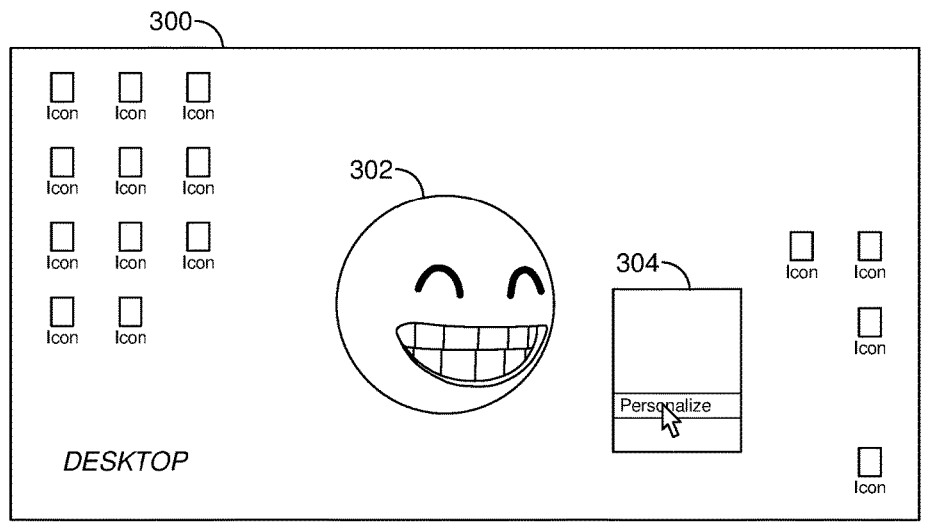
FIG. 3A is an illustration of a desktop window with an animated 3D object, in accordance with embodiments of the present invention.
Figure 3B:
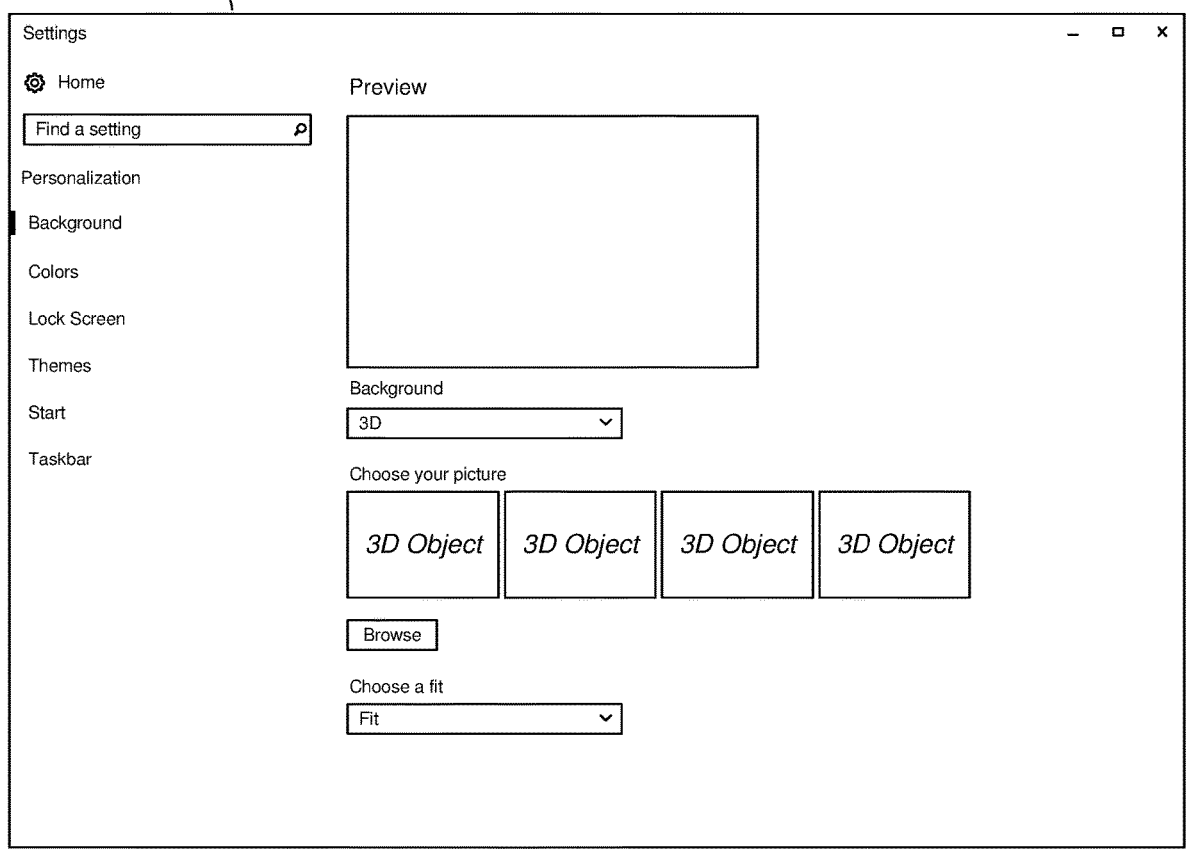
FIG. 3B is an illustration of a desktop personalization control interface with selectable 3D objects, in accordance with embodiments of the present invention.

FIGS. 3A and 3B illustrate another exemplary operating system feature that operates based on integrated 3D resource controls. FIG. 3A includes a desktop where the background is a 3D object 302. The 3D object can be selected and implemented such that the 3D object animates in the background of the desktop. Further, a 3D object can be personalized via an existing personalization control interface. As shown in FIG. 3B, a 3D object background configuration panel 300B can be an integrated panel such that a preview and selection of 3D objects is part of an existing personalization control interface. As discussed above, it is contemplated that the attributes of 3D object can be incorporated into the functionality (e.g., personalization) of the operating system features to provide additional options for personalization.

Figure 4A:
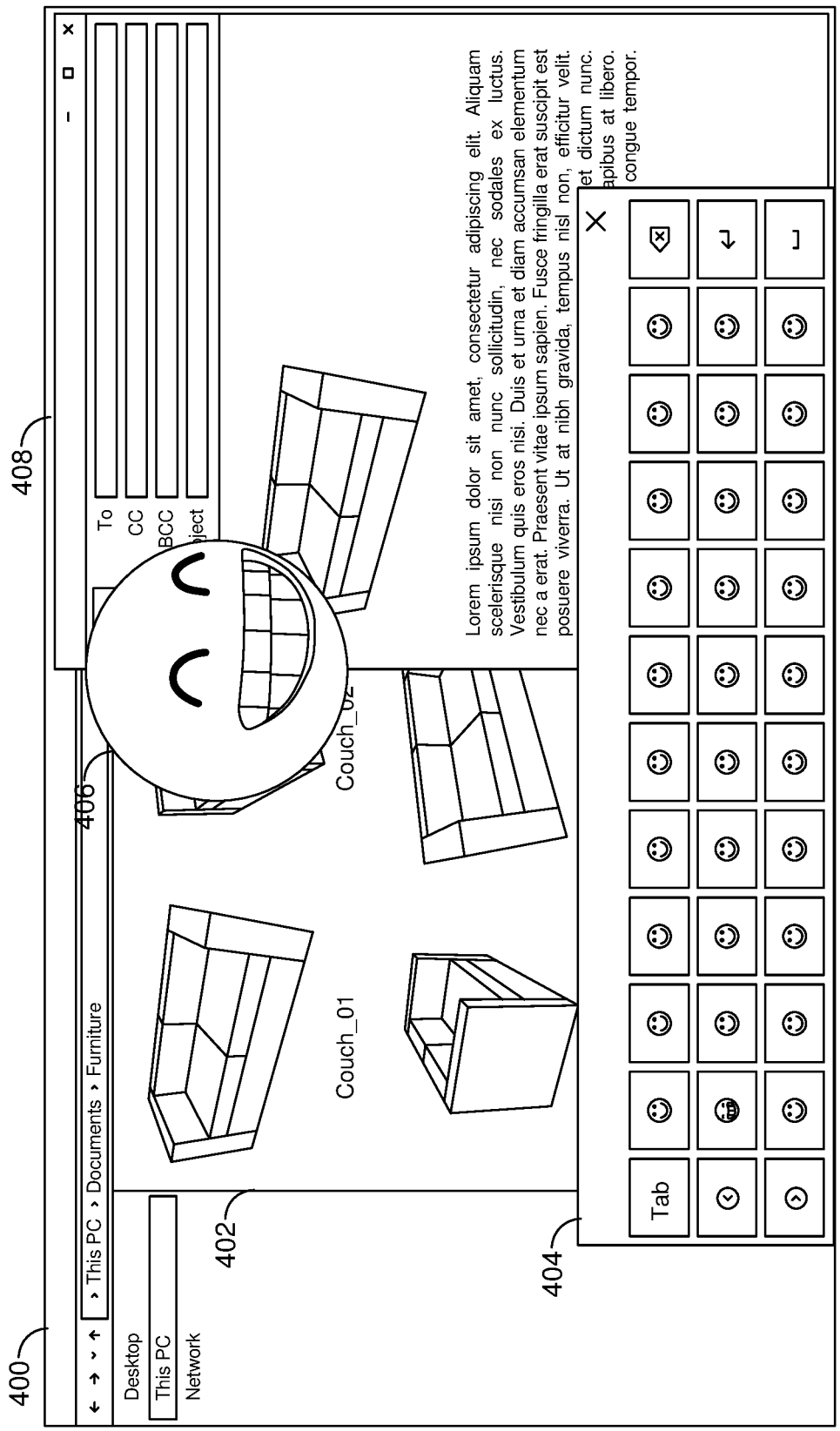
FIGS. 4A-4B are illustrations of an exemplary file explorer window for 3D objects, user input interface, and animated 3D objects, in accordance with embodiments of the present invention.
Figure 4B:
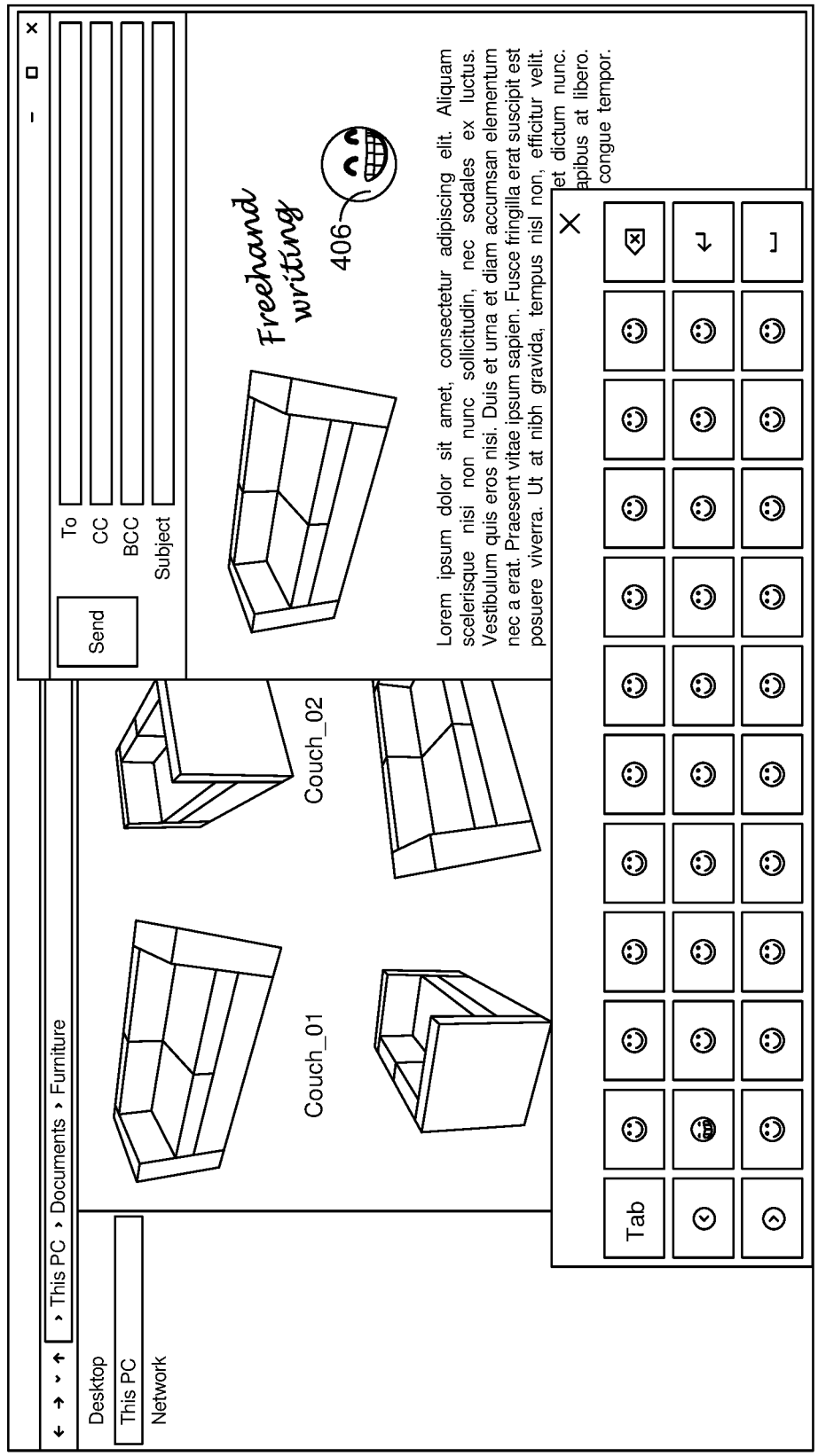

FIGS. 4A and 4B include illustrations of an exemplary file explorer window 402 (i.e., a file explorer control interface) for 3D objects, a user input interface 404, animated 3D object 406, application 408 on a desktop 400 in accordance with embodiments described herein. At a high level, FIGS. 4A and 4B highlight integration of 3D objects based on 3D object resource controls at the application level, OS level, and file explorer. As shown, all three levels operate to provide functionality between the different functional environments. For example, the file explorer allows for drag and drop functionality between the file explorer and an application (e.g., email application). The user input interface (e.g., a touchscreen keyboard) can present a plurality of 3D objects that when selected (e.g., selection of 3D object 406) can be animated across the desktop into the application 408 as shown in FIG. 4B.

Figure 5A:
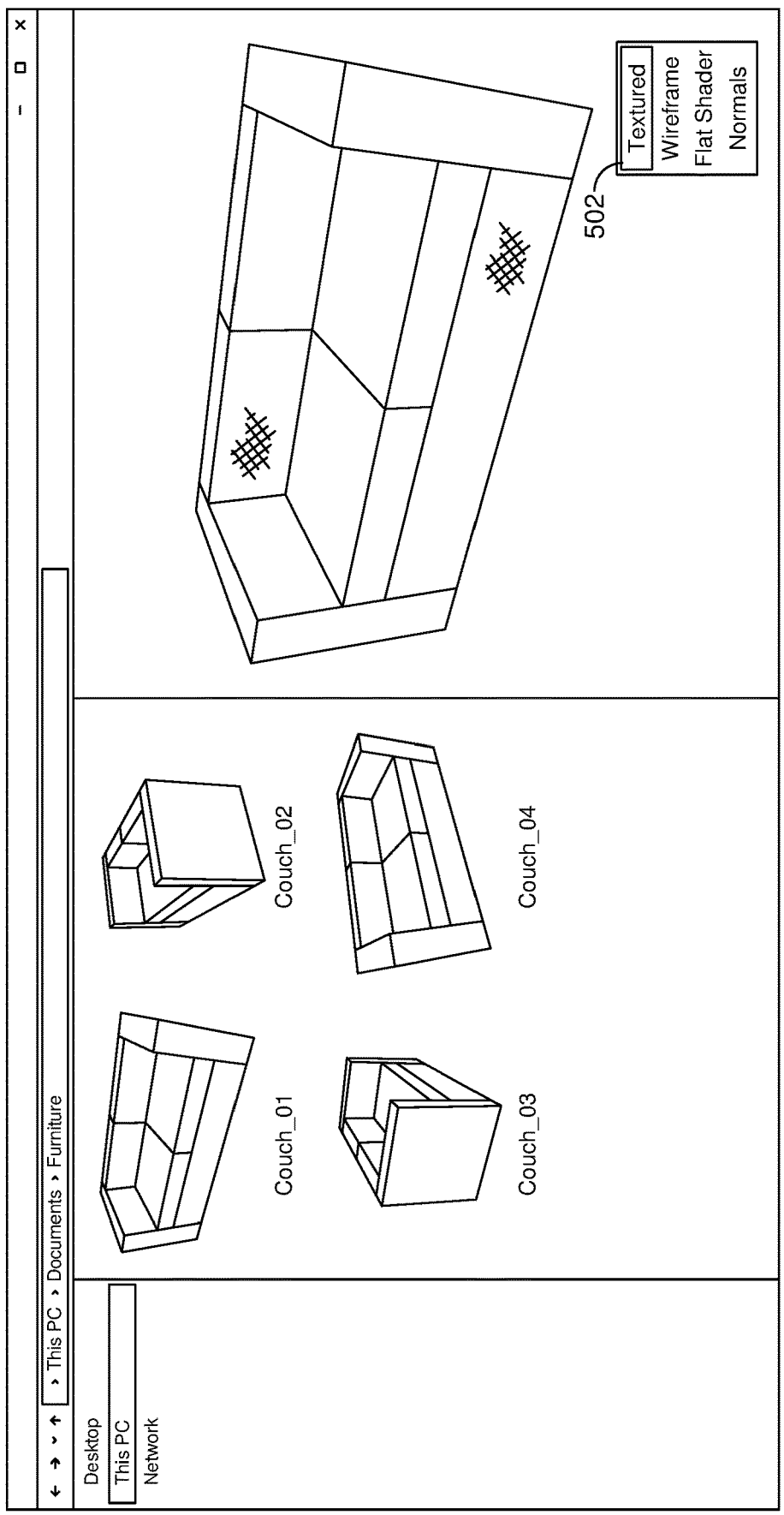
FIGS. 5A-5B are illustrations of an exemplary file explorer window for 3D objects with selectable control menu, in accordance with embodiments of the present invention.
Figure 5B:
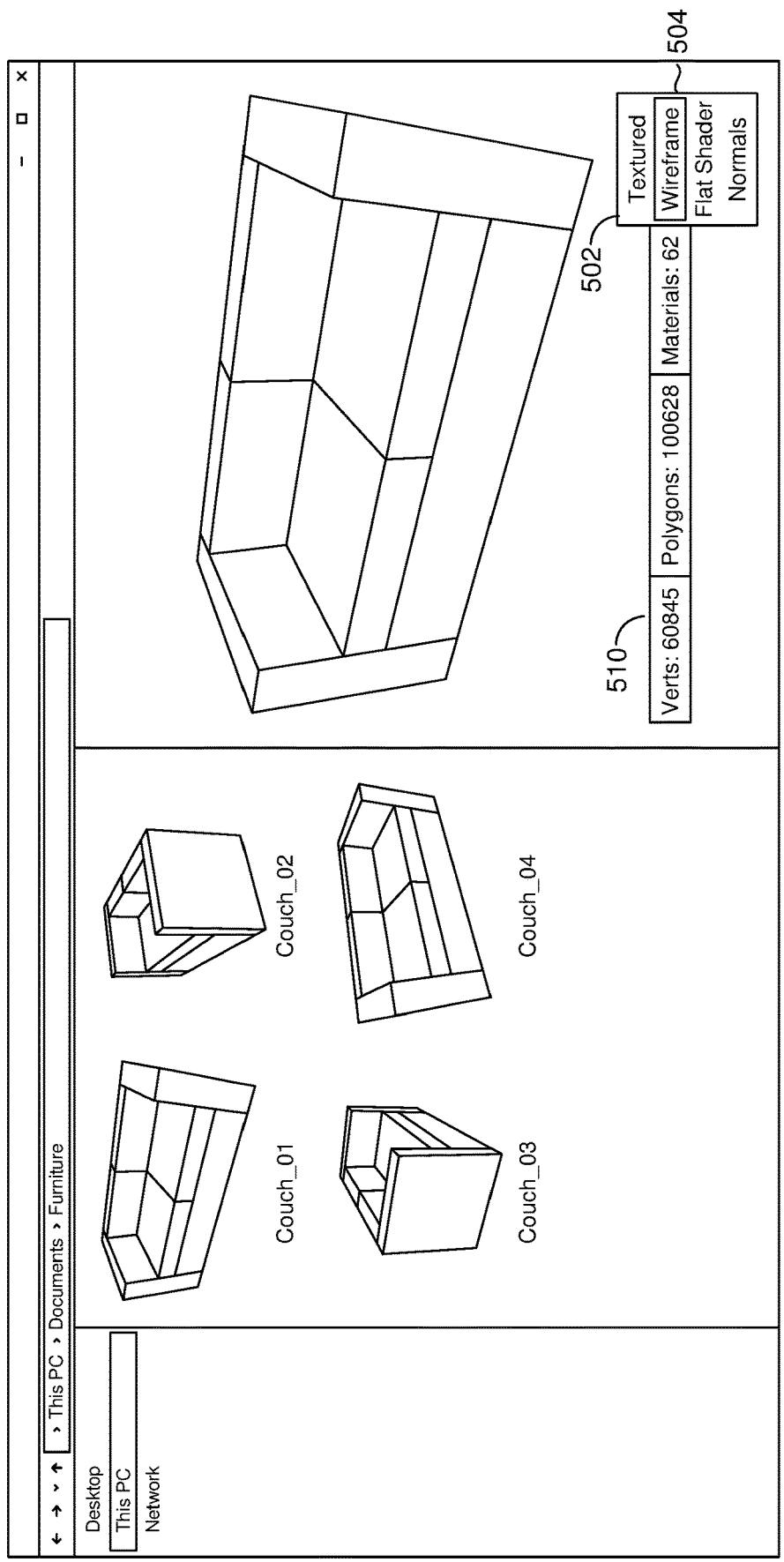

In FIG. 5A the file explorer further supports selecting 3D object based on specific attributes associated with the 3D object. It is contemplated that selection of the particular attribute automatically previews the 3D object with the selected attribute. The selected attribute (e.g. wireframe 504) can be further associated with additional sub-attributes (e.g., sub-attributes 510) which can also be selected and previewed.

Figure 6A:
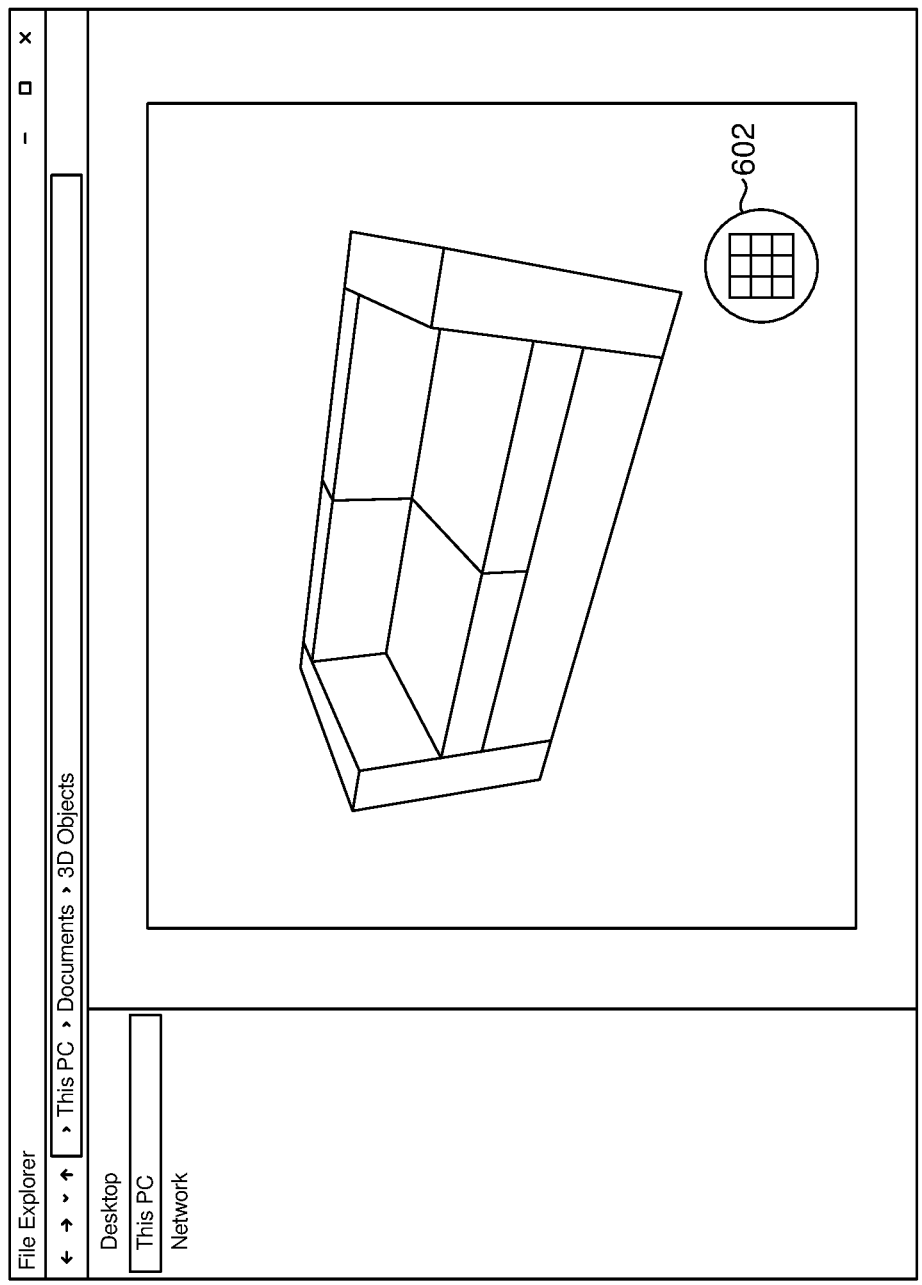
FIGS. 6A and 6B are illustrations of an file explorer window for 3D objects, in accordance with embodiments of the present invention.
Figure 6B:
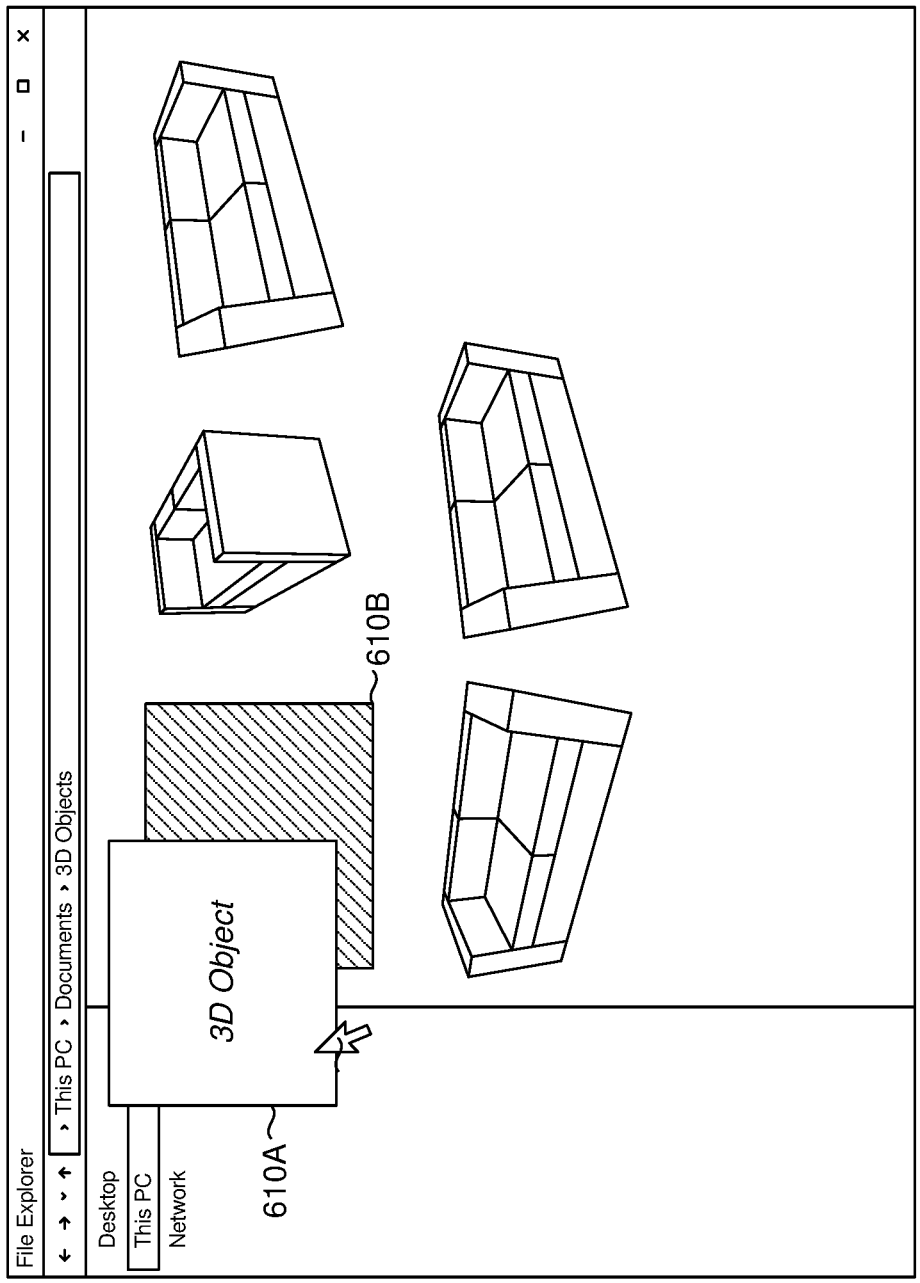
Figure 7:
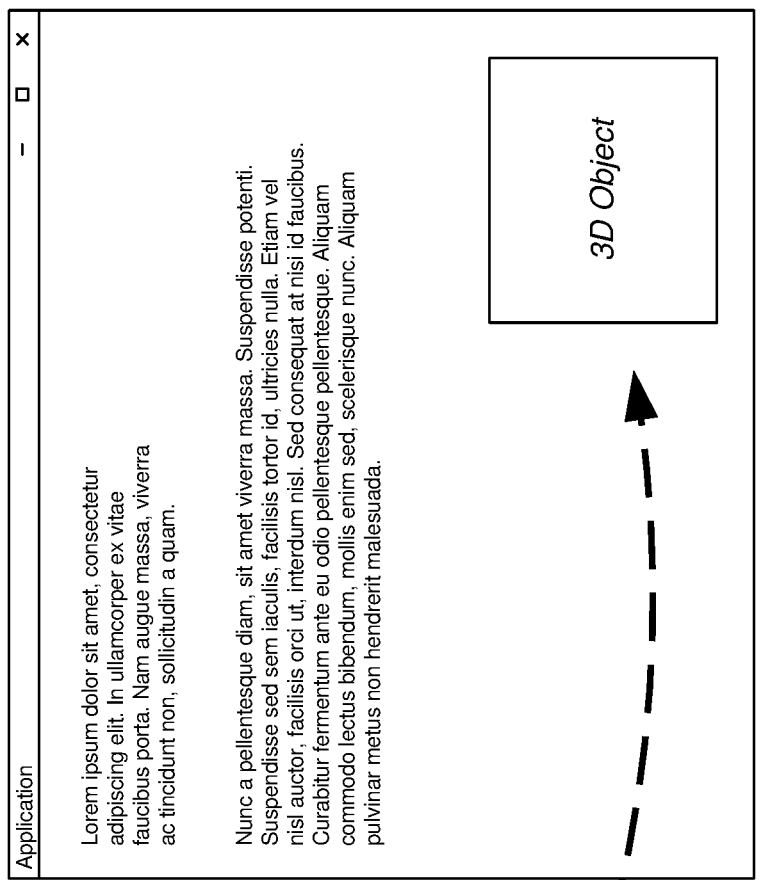
FIG. 7 is an illustration of a file explorer window for 3D objects including drag and drop functionality, in accordance with embodiments of the present invention.
Figure 7:
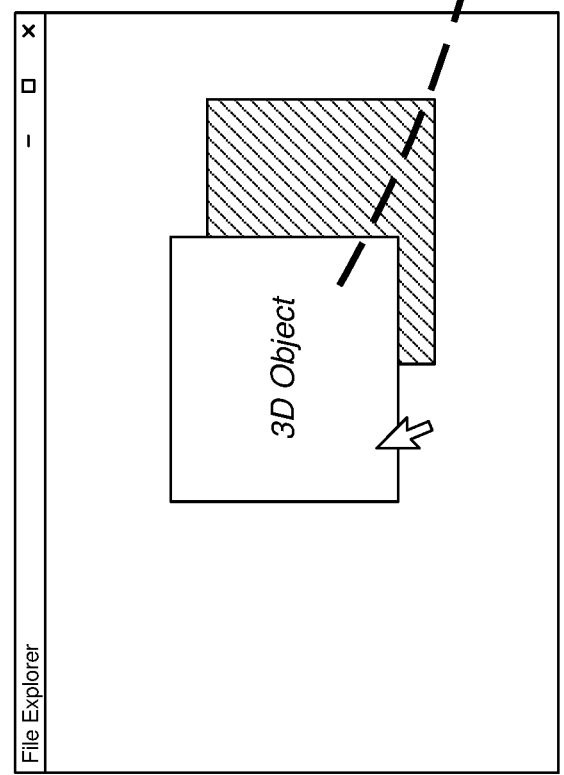

The file explorer in FIG. 6A also supports a selectable button that automatically changes the user interface into an augmented reality viewer, as discussed herein in more detail. The file explorer in FIG. 6B illustrates a selection of a 3D object 610A and an operation being triggered on the shadow illustration 610B of the 3D object. For example, the 3D object 610 may be rotating but upon selection the rotation is stopped or grayed-out as shown in shadow illustration 610B to indicate selection of the 3D object 620. It is contemplated that such indications can be based on inherenet properties of the 3D objects (e.g., capacity to rotate 360 degrees or perform a predefined animation). Other variations of visual indications of selections are contemplated with embodiments described herein. As shown in FIG. 7, a selected object can be dragged and dropped into an document editing application that supports authoring text in combination with 3D objects.

Figure 8:
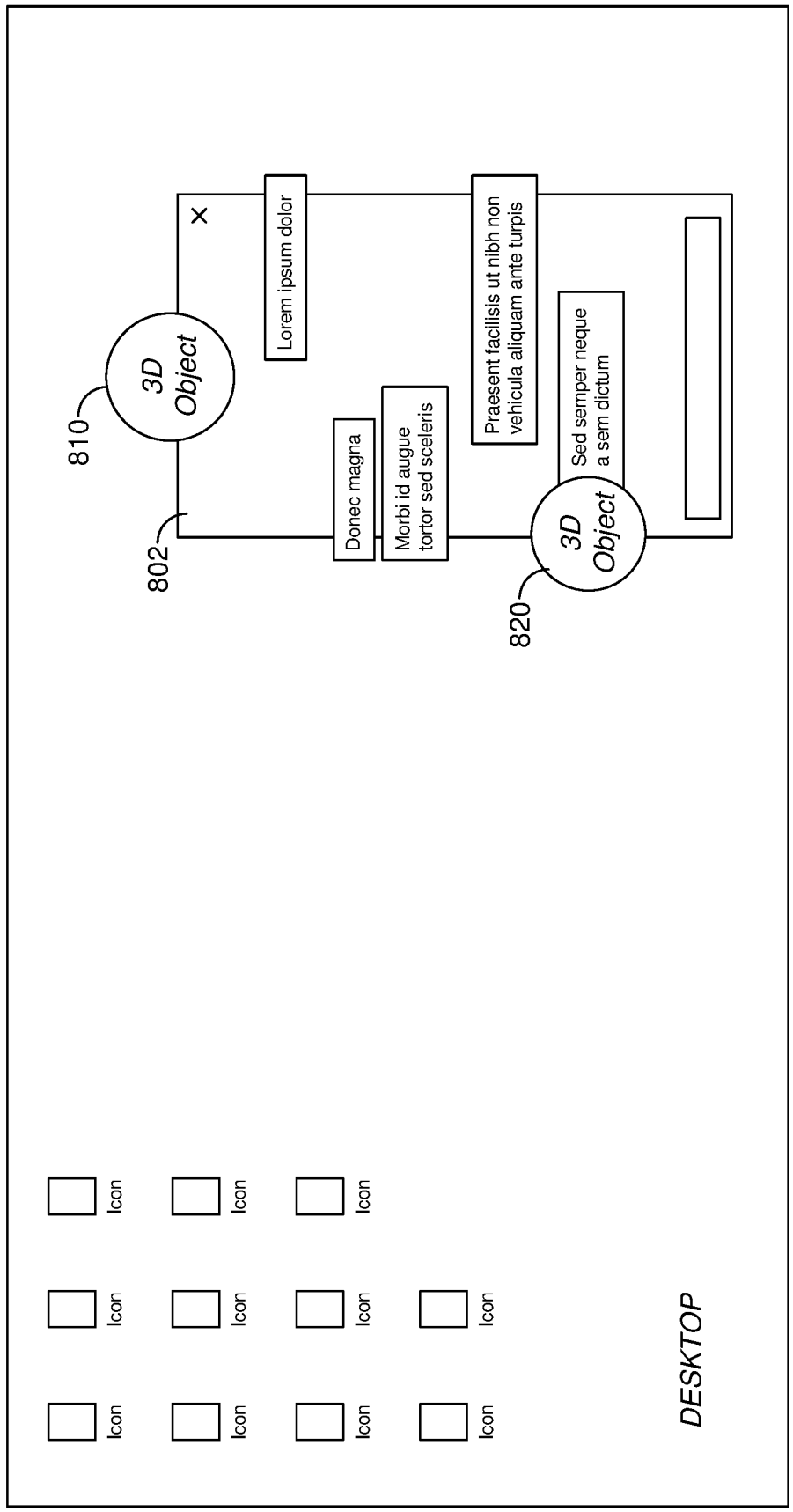
FIG. 8 is an illustration of an animated avatar in a chat program, in accordance with embodiments of the present invention.

FIG. 8 illustrates an integration of 3D objects as animated avatars within a chat program. As discussed, applications via the 3D resource manager and 3D resource controls can integrate functionality and 3D objects into existing application. In this case, the chat application can leverage the integration resources and incorporate 3D objects as avatars (e.g., 810 and 820) into the chat application. The avatars and their 3D animation features can automatically animate or be incorporated into specific functionality of the chat application. For example, when a user associated with 3D object avatar 810 is typing the 3D object can be animated and vice versa. Other variations of 3D object attributes associated with existing functionality of an application are contemplated with embodiments described herein.

Figure 9A:
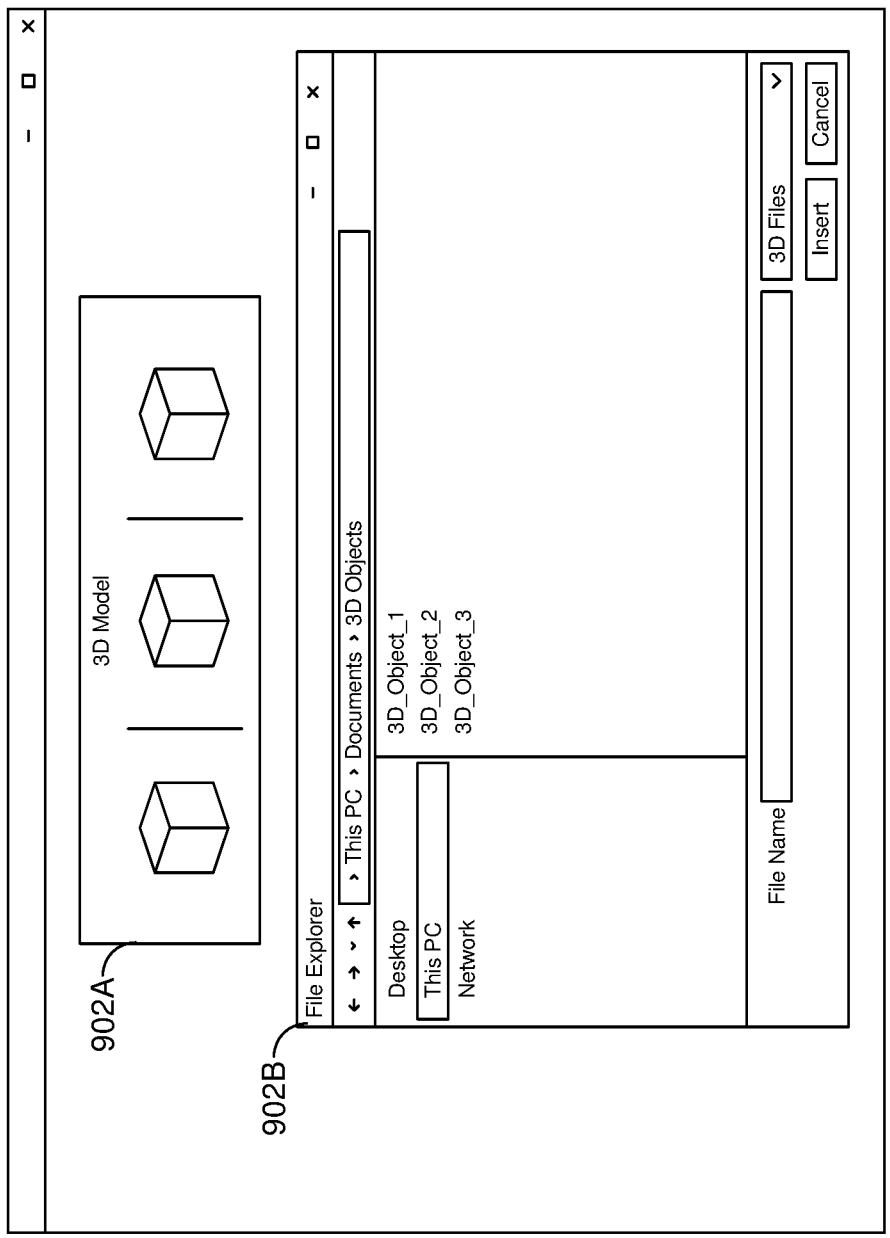
FIG. 9A-9B is an illustration of a 3D resource control supporting author mode of an application, in accordance with embodiments of the present invention.
Figure 9B:
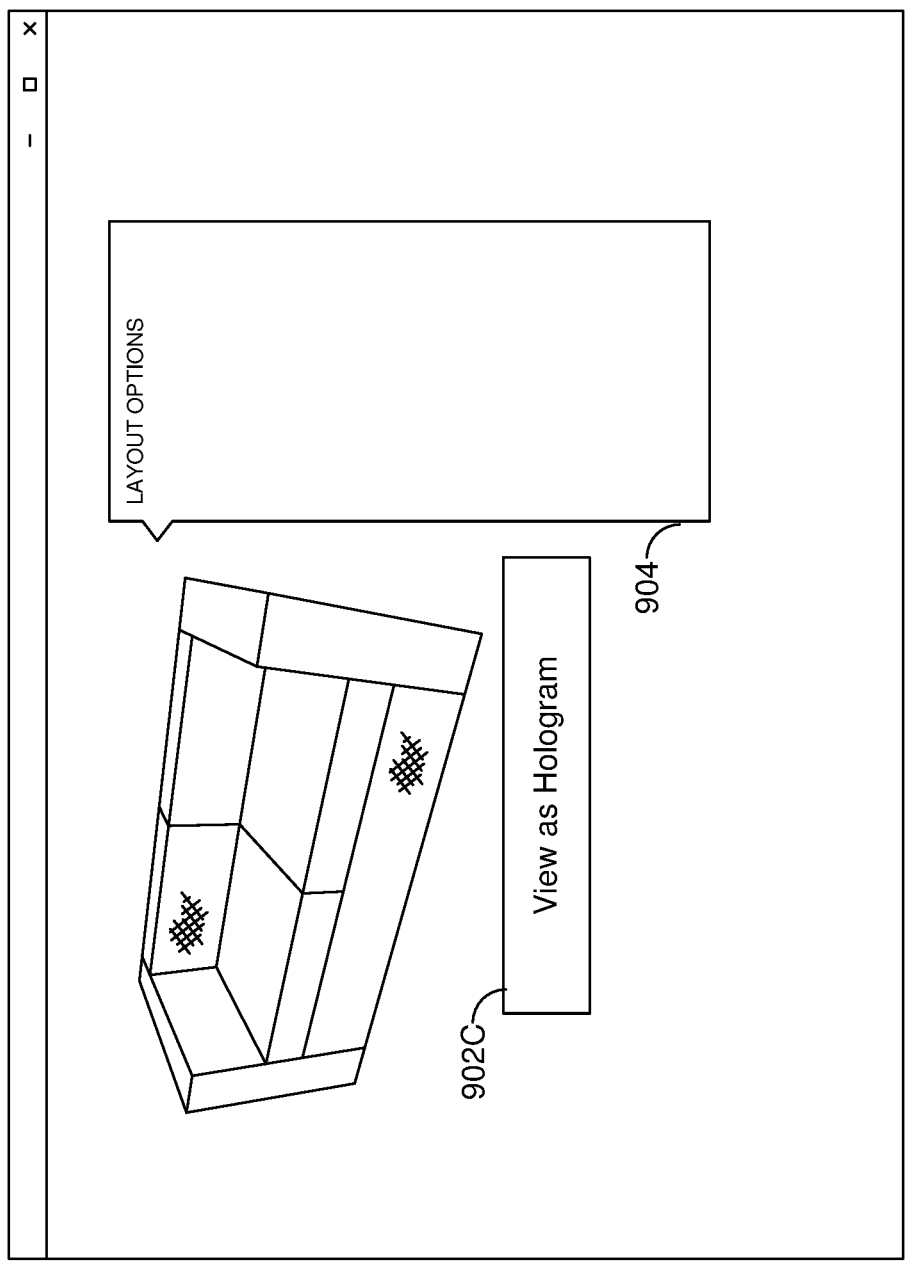

FIGS. 9A and 9B are illustrations of a an application having a 3D resource control interface (e.g., application ribbon interface 902A and file explore control interface 902B in FIG. 9A and augmented reality control interface 902C in FIG. 9B) incorporated into the application interface. The 3D resource control can be made available from the 3D resource manager. The 3D resource control can be available via the application at launch time of the application or anytime the functionality associated with the 3D resource control is triggered. For example, the 3D resource control can support accessing the file explorer to access 3D objects. As shown, a file explorer control interface 902B can be generated based on selecting the 3D resource control to access 3D objects. In this regard, existing applications can integrate 3D resource controls and functionality that utilize functional operators available at the existing applications. Other functionality not previously available via the application may also be possible. For example, as shown in FIG. 9B, functionality associated with projecting directly from the application to an augmented reality viewer (e.g., selectable "view as hologram button") and layout options 904 specifically associated with attributes of the 3D objects can be functionality that is incorporated as new functionality in existing applications. In this regard, the 3D resource controls support authoring documents with integrated 3D objects and functionality.

Figure 10B:
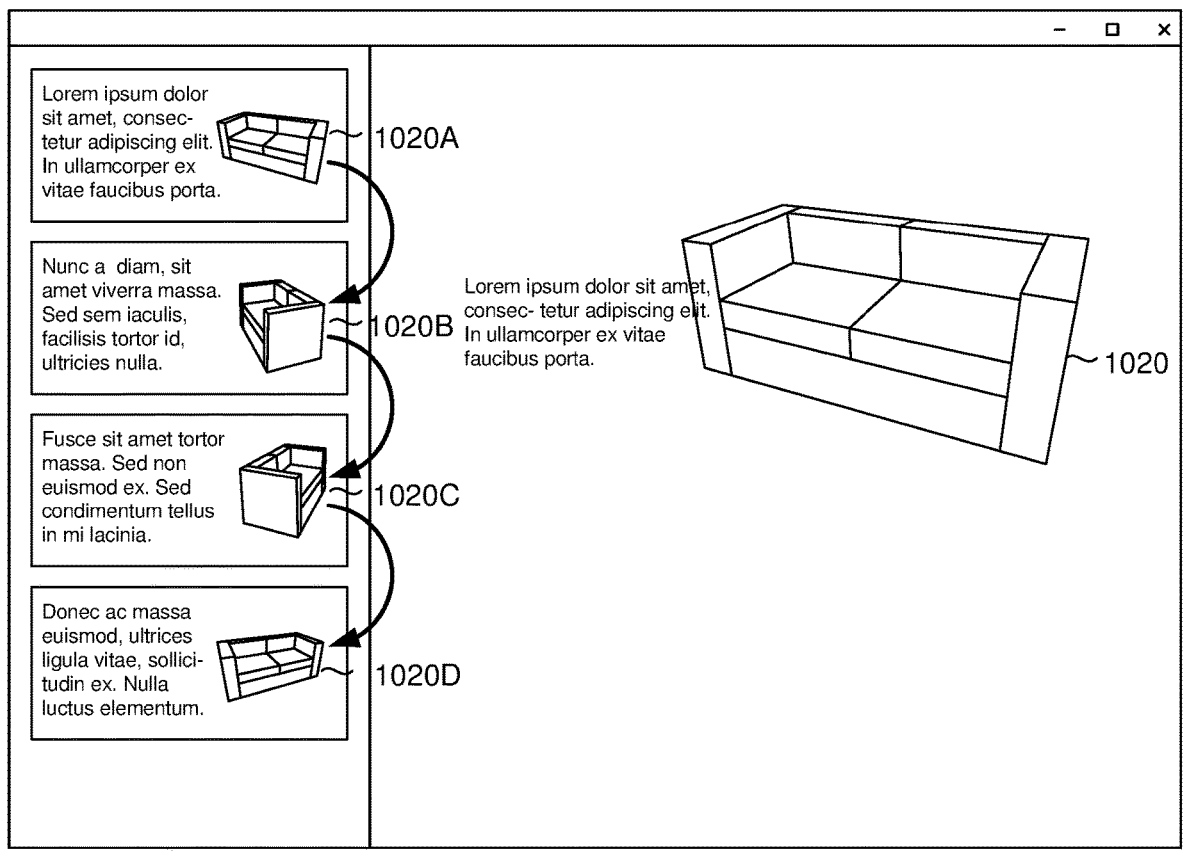

With reference to FIGS. 10A and 10B, 3D objects can allow for interactive functionality in a presentation document that further includes a presentation mode of the document. For example, during a presentation mode, 3D objects can be integrated into a presentation application, such that during a presentation, specific functionality associated with the 3D objects can be performed. As shown in FIG. 10A, the 3D object 1010 has been incorporated as an active object for presentation mode. As such, during presentation mode, the 3D object can support interactive functionality configured during an authoring mode. In FIG. 10B, another exemplary 3D object 1020 that is authored to leverage the different perspectives of the 3D object. The 3D object 1030 can be authored, such that, on each individual slide a different perspective of the 3D object is shown (e.g., 1020A, 1020B, 1020C, and 1020D). As such, during a presentation mode an automatic interpolation between different perspectives is performed as the presentation goes form slide to slide. Other variations and combination of functionality of 3D objects that can be authored and provided for presentation are contemplated with embodiments described herein.

Figure 11A:
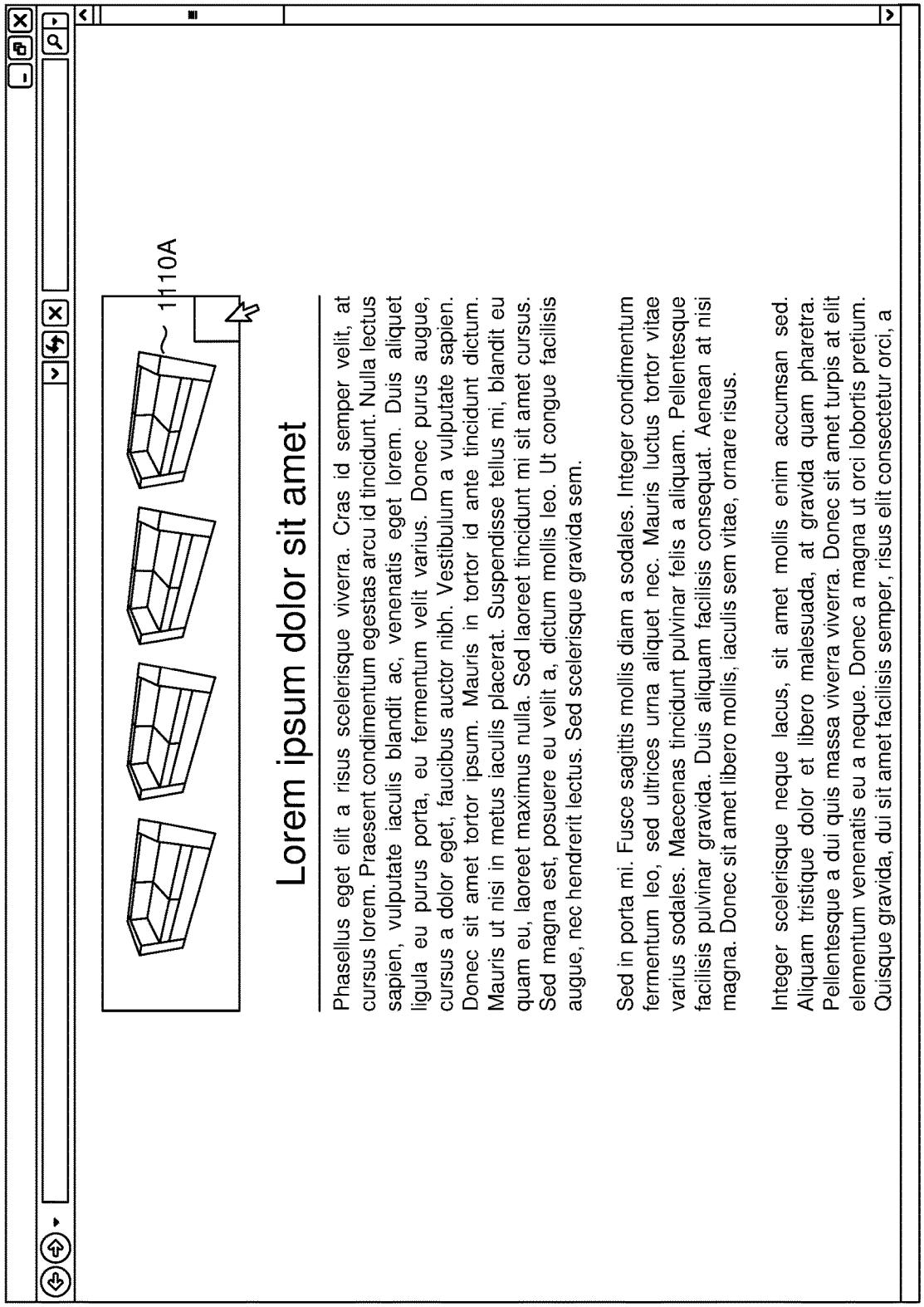
FIGS. 11A-11C are illustrations of a 3D resource control supporting an augmented reality viewing, in accordance with embodiments of the present invention.
Figure 11B:
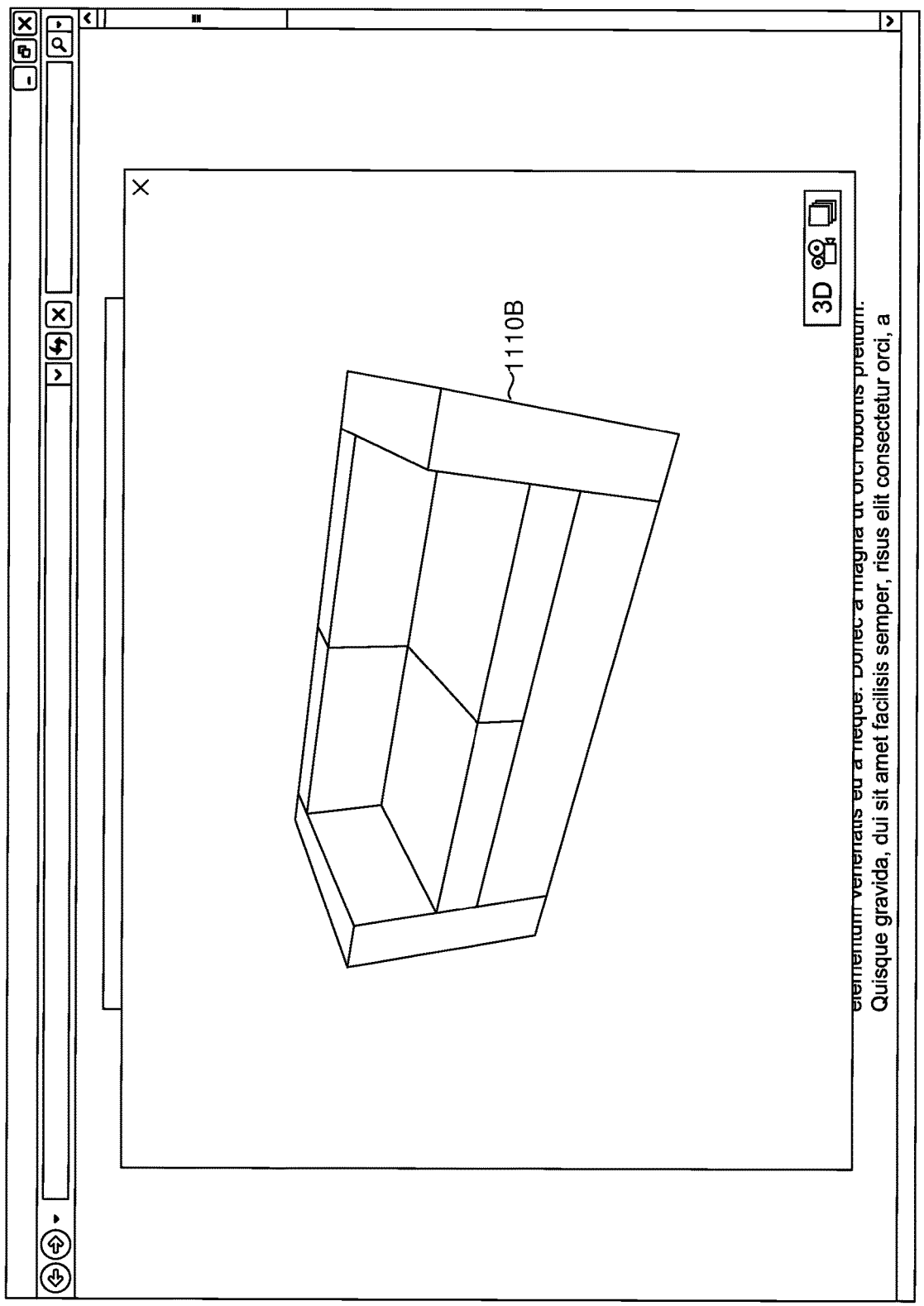
Figure 11C:
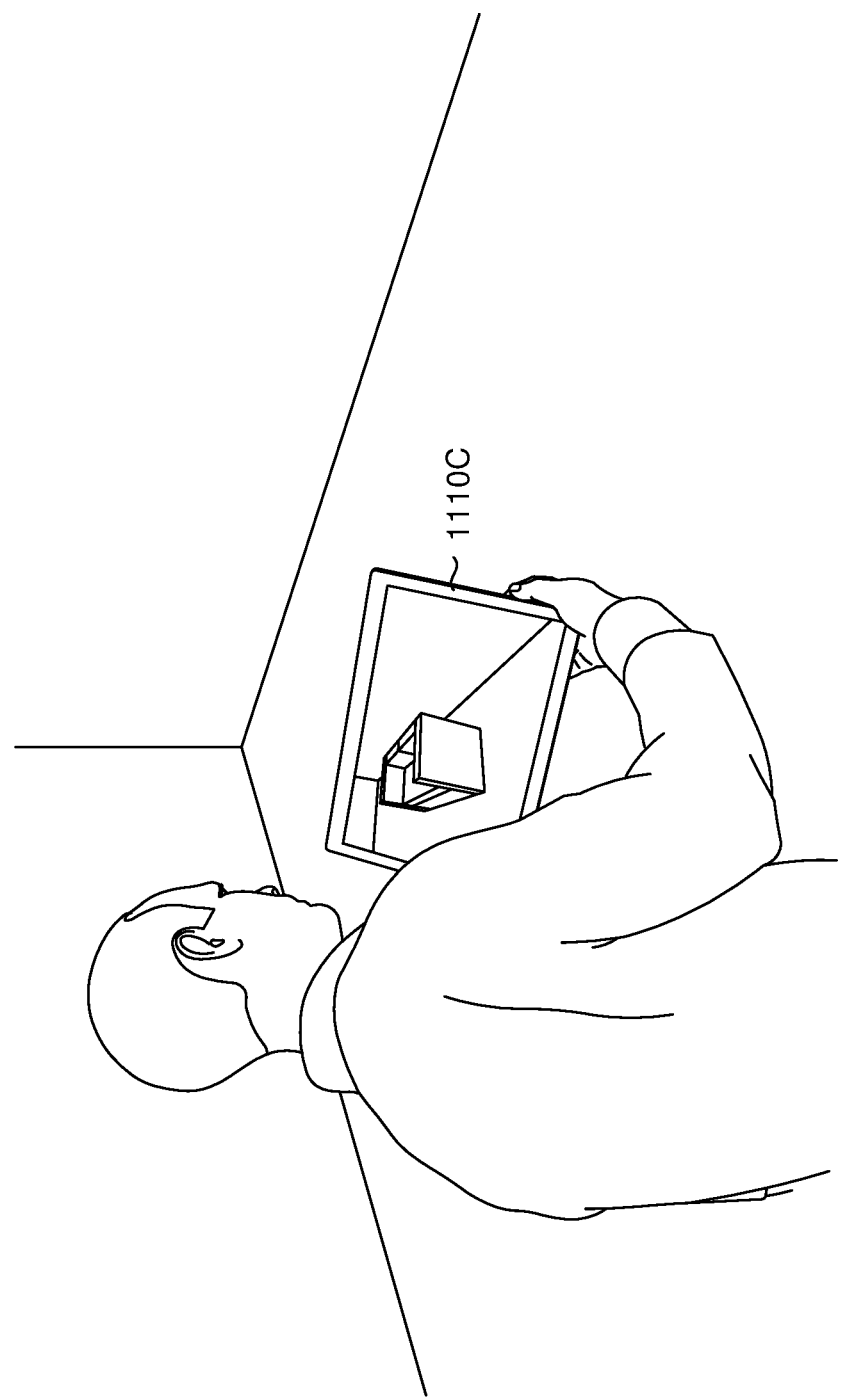

With reference to FIGS. 11A-11C, a web browsing application can be integrated with 3D resource controls that support augmented reality views. For example, a user can use a browser application to access a shopping portal and select a 3D object 1110A of an item the user would like to purchase. Within the browser application is a 3D resource control that support determining that the 3D object can be used to augmented reality view and providing and interface to do so. As shown in FIG. 11B, 1110B is selected for an augmented reality view (e.g., via an augmented reality control interface). In FIG. 11C, the user views the 3D object 1110C in his actual space and at scale to inform his decision prior to making a purchase.

Figure 12A:
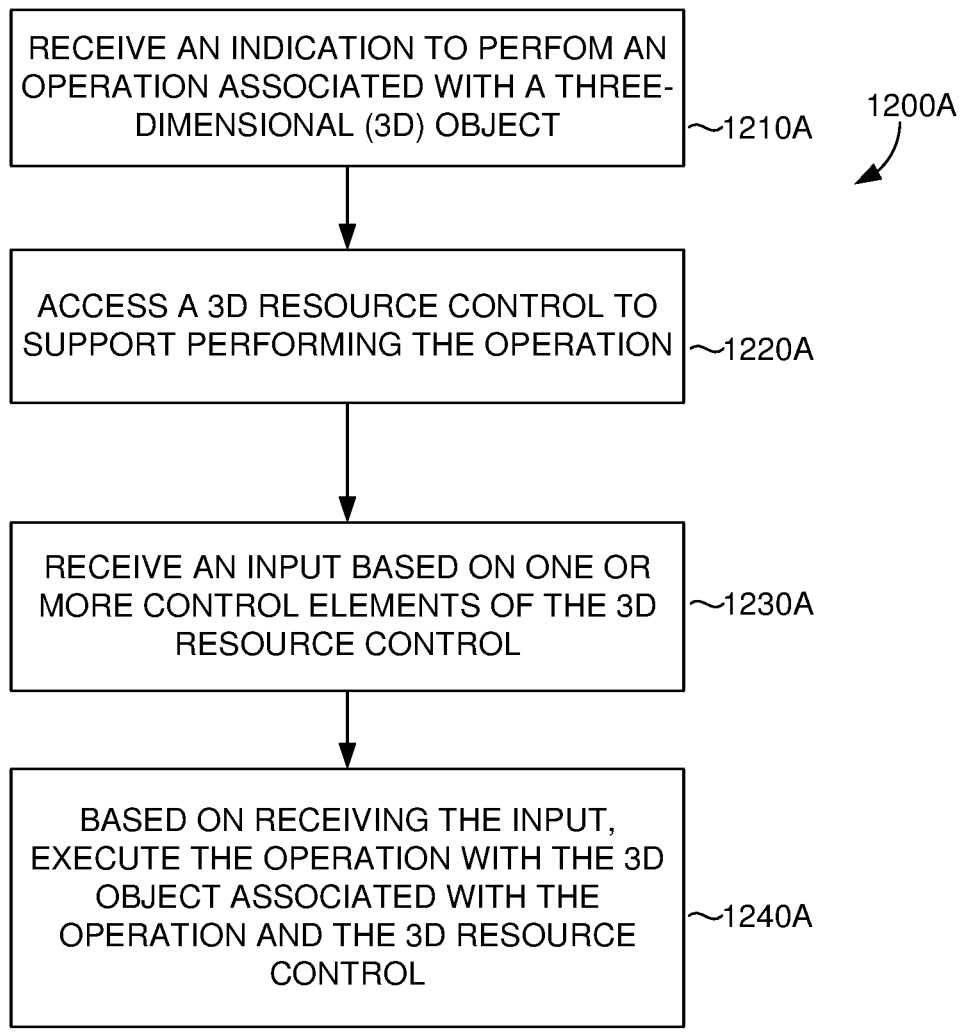
FIGS. 12A and 12B are flow diagrams showing a method for implementing a 3D resource integration system, in accordance with embodiments of the present invention.

With reference to FIG. 12A, FIG. 12A illustrates an exemplary method 1200A for implementing a 3D resource integration system. The method can be implemented using the 3D resource integration system described above. Initially at block 1210A, an indication to perform an operation, associated with a 3D object, is received. At block 1220A, one or more 3D resource controls, associated with the operation, to support performing the operation, are accessed from a 3D integration manager. The 3D resource control is a defined set of instructions on how to integrate 3D resources with 3D objects for generating 3D-based graphical interfaces associated with operations of application features and operating system features.

At block 1230A, an input, based on one or more control elements of the one or more 3D resource controls, is received from the 3D integration manager. The input comprises the one or more control elements that operate to generate a 3D-based graphical interface for the operation. At block 1240A, based on receiving the input, the operation is executed with the 3D object and 3D-based graphical interface for the operation.

The operation and the 3D object can be associated with a desktop background operating system feature. The 3D object is integrated into the desktop background based on the 3D resource control, such that, based on user input for the desktop background, the 3D-based graphical interface is generated with the 3D object. Also, the operation and the 3D object may be associated with a lock screen operating system feature. The 3D object is integrated into the lock screen based on the 3D resource control, such that, based on user input at lock screen the 3D-based graphical interface is generated with the 3D object.

Further, the operation and the 3D object are associated with an interactive functionality configured in authoring-mode for a presentation-authoring application in presentation mode. The 3D object is may also be integrated into the presentation-authoring application based on the 3D resource control, the 3D object, for each slide of the presentation-authoring application is associated with a selected 3D perspective from a plurality of 3D perspectives of the 3D object, such that, based on user input, 3D-based graphical interface is generated with the 3D object automatically interpolating between perspectives of corresponding slides. The operation and the 3D object can be associated with an avatar feature of a chat application. The 3D-based graphical interface comprises animating an avatar of the avatar feature based on functionality of the chat application.

Figure 12B:
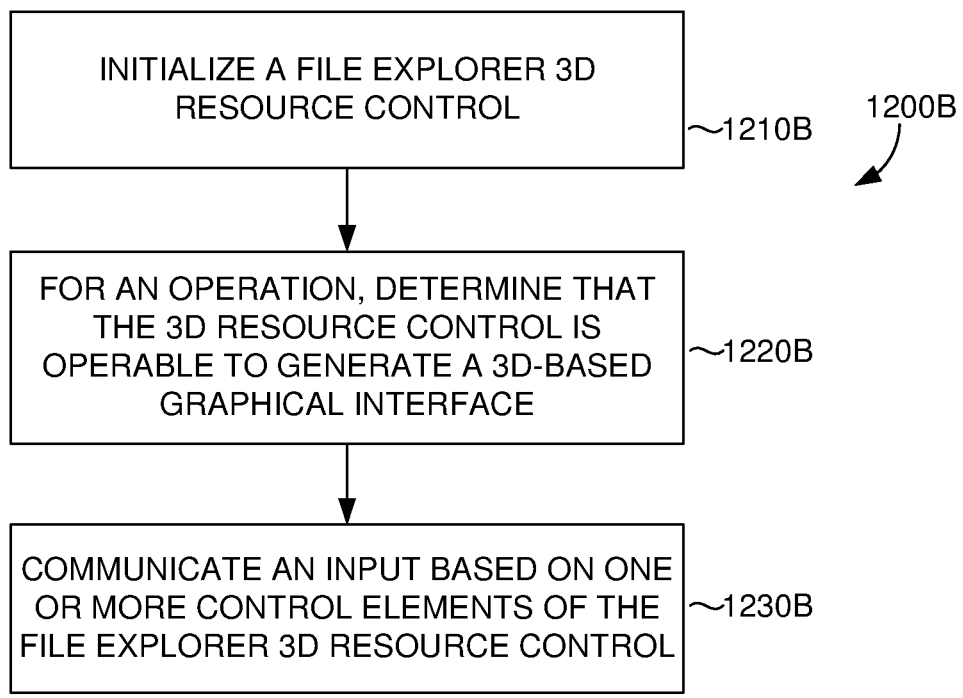

With reference to FIG. 12B, FIG. 12B illustrates an exemplary method 1200B for implementing a 3D resource integration system. The method can be implemented using the 3D resource integration system described above. Initially at block 1210B, initialize a file explorer 3D resource control. The file explorer 3D resource control is a defined set of instructions on how to integrate 3D resources with 3D objects for generating 3D-based graphical interfaces associated with operations an application or an operating system. The file explorer 3D resource control generates the 3D-based graphical interface for the operation based on attributes of the 3D object and the application or operating system associated with the operation. The 3D-based graphical interface comprises a file explorer control interface from which a plurality of 3D perspectives of the 3D object are displayed and 3D actions of the 3D object are directly performed.

In one embodiment, the file explorer 3D resource control with the one or more control elements operates to generate a selectable icon for an augmented reality control, the augmented reality control operates to transition from selecting the 3D object into an augmented reality control interface where the 3D object is viewable as a hologram in a real world environment.

At block 1220B, for an operation associated with a 3D object, it is determined that the file explorer 3D resource control is operable to generate a 3D-based graphical interface for the operation. The operation and the 3D object are associated with a file explorer control interface and an application interface or an operating system interface, where the 3D object is integrated into the file explorer control interface and the application interface or operating system interface, such that, based on user input, the 3D-based graphical interface is generated comprising the 3D object transitioning from the file explorer control interface to the application interface or the operating system interface. The operation can be a drag and drop operation from a file explorer control interface to an application interface.

At block 1230B, an input is communicated based on one or more control elements of the file explorer 3D resource control. The input comprises the one or more control elements that operate to generate a 3D-based graphical interface for the operation. The operation is executed with the 3D object and the 3D-based graphical interface. For example, the operation and the 3D object can be associated with a desktop background operating system feature, where the 3D object is integrated into the desktop background. The file explorer 3D resource control generates a file explorer control interface within a personalization control interface for selecting 3D object for the desktop background.

Figure 13:
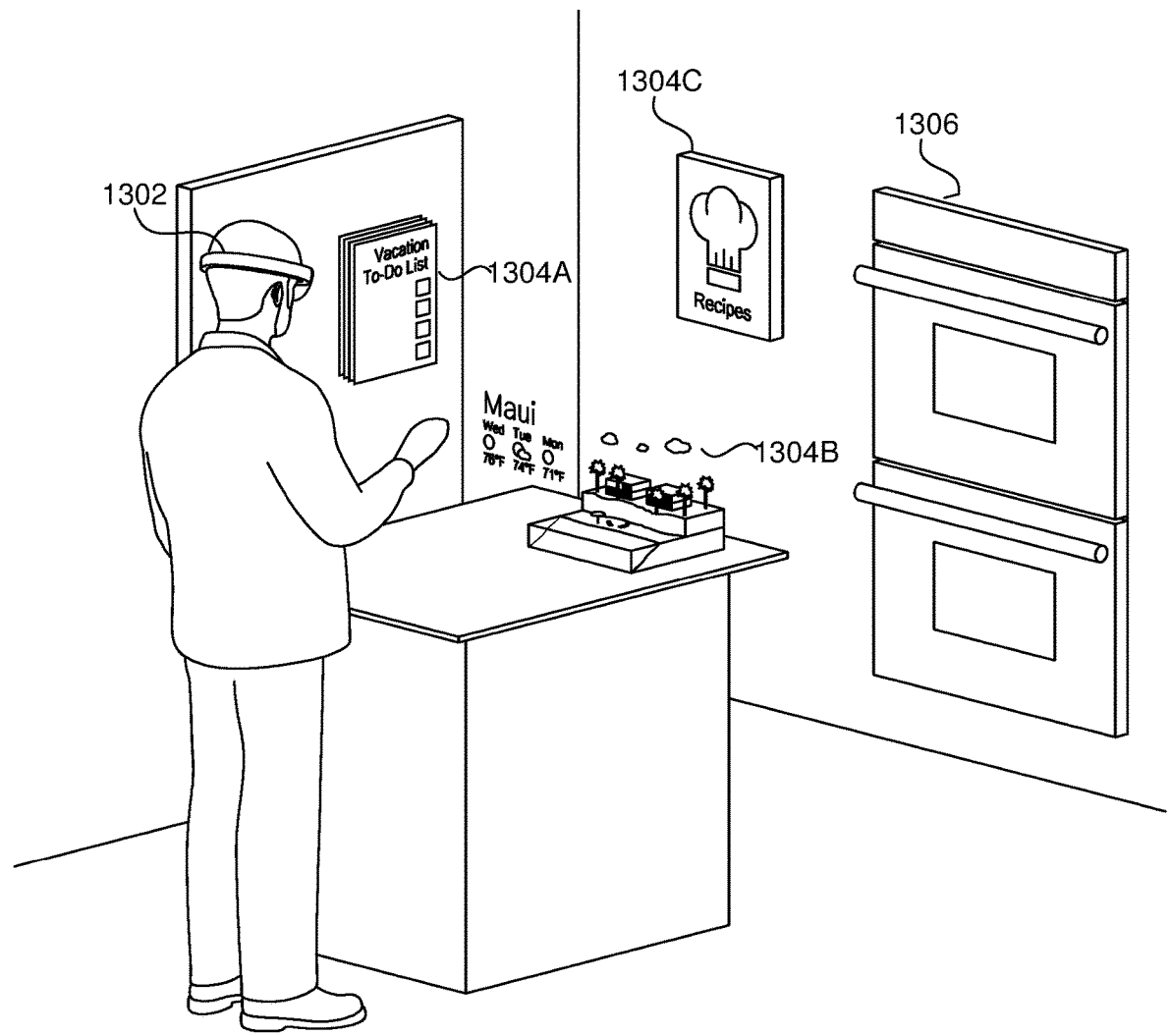
FIG. 13 is an illustrated diagram showing exemplary augmented reality images of a head-mounted display device, in accordance with embodiments of the present invention.

With reference to FIG. 13, exemplary images of a head-mounted display (HMD) device 1302 are depicted. Augmented reality images (e.g., 1304A, 1304B and 1304C), comprising corresponding virtual images provided by the HMD 1302 device, generally include the virtual images that appear superimposed on a background and may appear to interact with or be integral with the background 1306. The background 1306 is comprised of real-world scene, e.g., a scene that a user would perceive without augmented reality image emitted by the HMD 1302 device. For example, an augmented reality image can include the recipe book icon 1304C that appears superimposed and hanging in mid-air in front of the cooking oven or wall of the background 1306.

Figure 14:
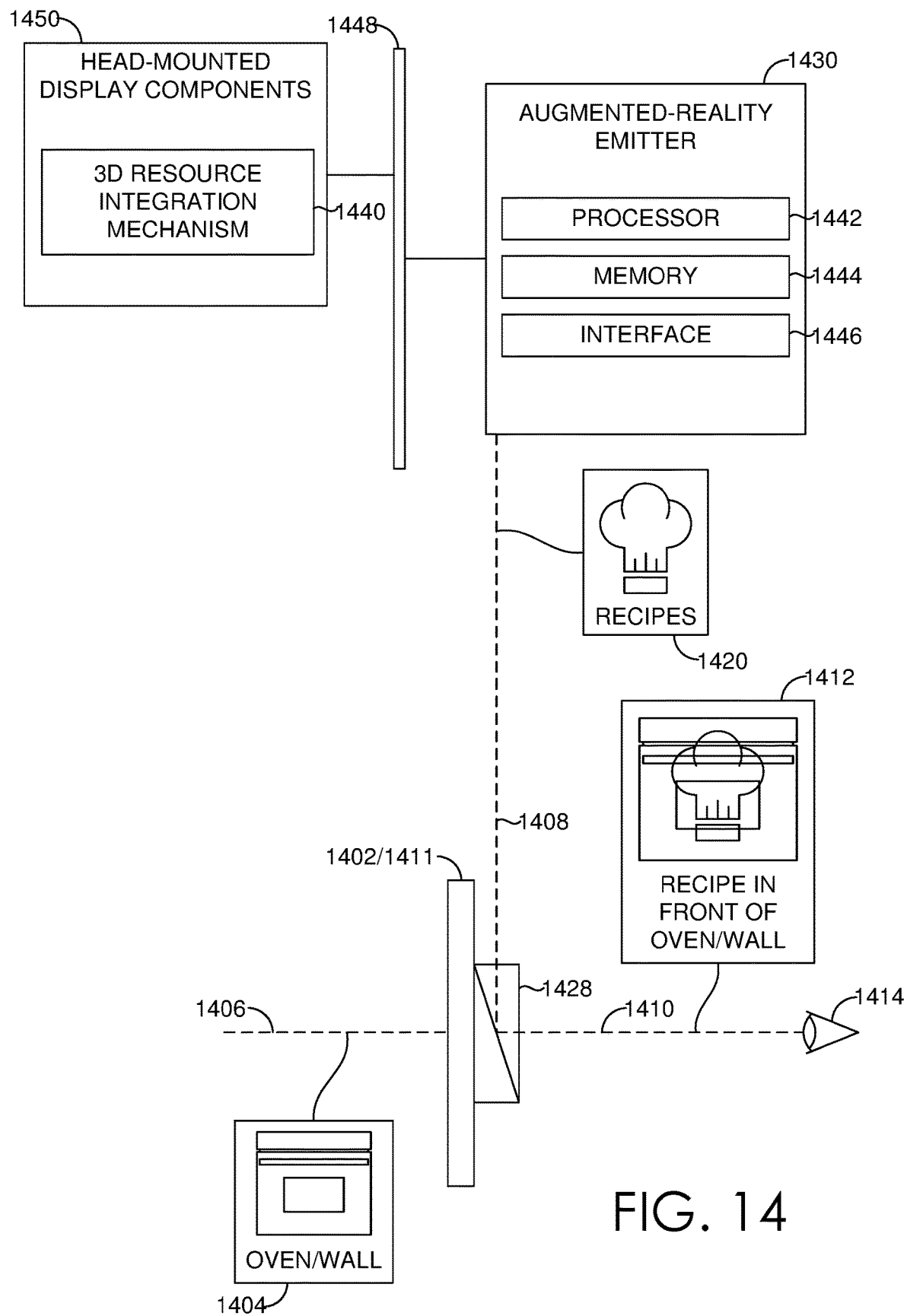
FIG. 14 is a block diagram of an exemplary head-mounted display device, in accordance with embodiments of the present invention.

Turning to FIG. 14, the HMD device 1402 having the user-height-based rendering mechanism 1440 is described in accordance with an embodiment described herein. The HMD device 1402 includes a see-through lens 1410 which is placed in front of a user's eye 1414, similar to an eyeglass lens. It is contemplated that a pair of see-through lenses 1410 can be provided, one for each eye 1414. The lens 1410 includes an optical display component 1428, such as a beam splitter (e.g., a half-silvered mirror). The HMD device 1402 includes an augmented reality emitter 1430 that facilitates projecting or rendering the of augmented reality images. Amongst other components not shown, the HMD device also includes a processor 1442, memory 1444, interface 1446, a bus 1448, and additional HMD components 1450. The augmented reality emitter 1430 emits light representing a virtual image 1402 exemplified by a light ray 1408. Light from the real-world scene 1404, such as a light ray 1406, reaches the lens 1410. Additional optics can be used to refocus the virtual image 1402 so that it appears to originate from several feet away from the eye 1414 rather than one inch away, where the display component 1428 actually is. The memory 1444 can contain instructions which are executed by the processor 1442 to enable the augmented reality emitter 1430 to perform functions as described. One or more of the processors can be considered to be control circuits. The augmented reality emitter communicates with the additional HMD components 1450 using the bus 1448 and other suitable communication paths.

Light ray representing the virtual image 1402 is reflected by the display component 1428 toward a user's eye, as exemplified by a light ray 1410, so that the user sees an image 1412. In the augmented-reality image 1412, a portion of the real-world scene 1404, such as, a cooking oven is visible along with the entire virtual image 1402 such as a recipe book icon. The user can therefore see a mixed-reality or augmented-reality image 1412 in which the recipe book icon is hanging in front of the cooking oven in this example.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Having described embodiments of the present invention, an exemplary operating environment in which embodiments of the present invention may be implemented is described below in order to provide a general context for various aspects of the present invention. Referring initially to FIG. 10 in particular, an exemplary operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 15:
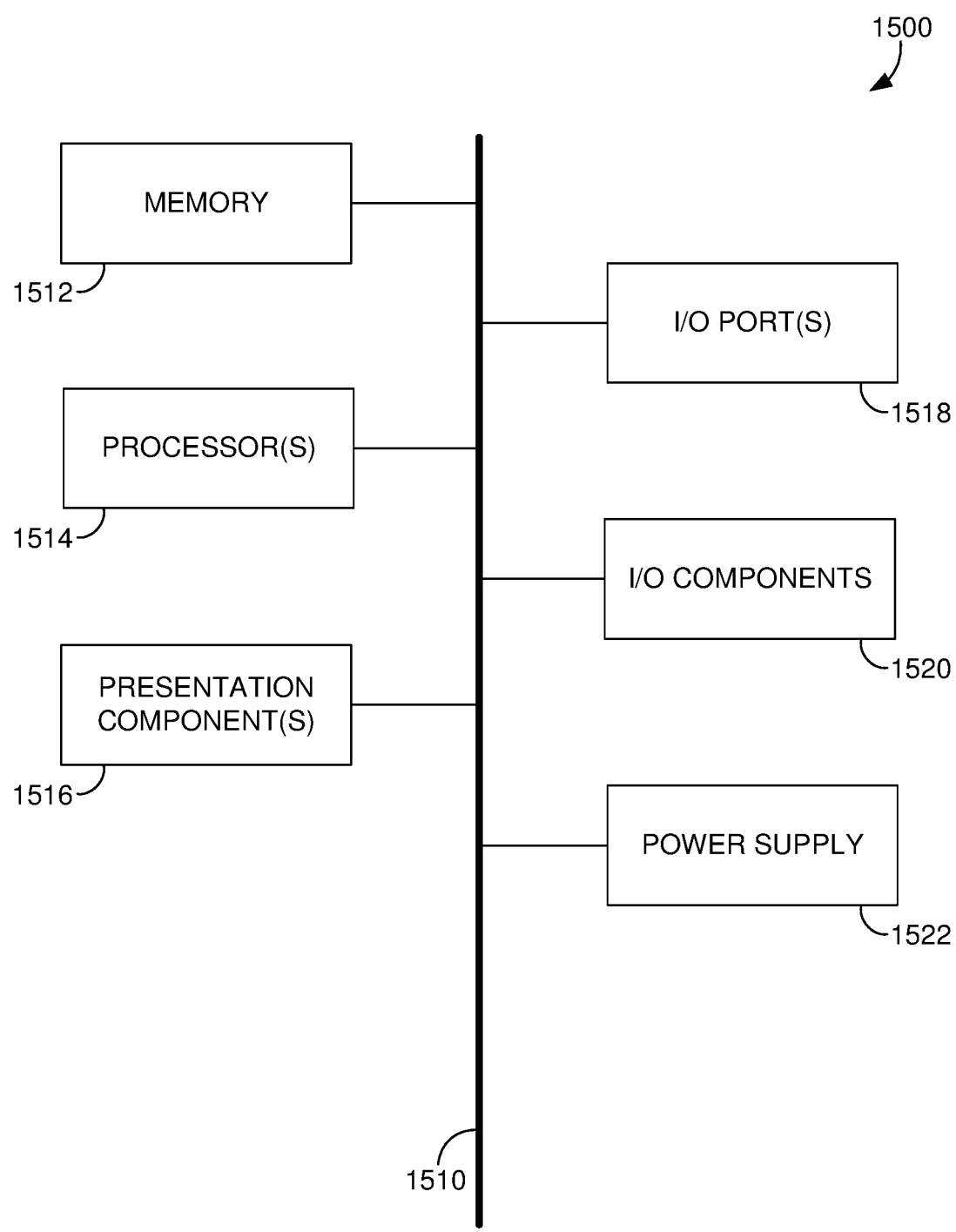
FIG. 15 is a block diagram of an exemplary computing environment suitable for use in implementing embodiments of the present invention.

With reference to FIG. 15, computing device 1500 includes a bus 1510 that directly or indirectly couples the following devices: memory 1512, one or more processors 1514, one or more presentation components 1516, input/output ports 1518, input/output components 1520, and an illustrative power supply 1522. Bus 1510 represents what may be one or more busses (such as an address bus, data bus, or combination thereof). Although the various blocks of FIG. 15 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 15 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 15 and reference to "computing device."

Computing device 1500 typically includes a variety of computer-readable media. Computer-readable media can be any available media that can be accessed by computing device 1500 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1500. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1512 includes computer storage media in the form of volatile and/or nonvolatile memory. The memory may be removable, non-removable, or a combination thereof. Exemplary hardware devices include solid-state memory, hard drives, optical-disc drives, etc. Computing device 1500 includes one or more processors that read data from various entities such as memory 1512 or I/O components 1520. Presentation component(s) 1516 present data indications to a user or other device. Exemplary presentation components include a display device, speaker, printing component, vibrating component, etc.

I/O ports 1518 allow computing device 1500 to be logically coupled to other devices including I/O components 1520, some of which may be built in. Illustrative components include a microphone, joystick, game pad, satellite dish, scanner, printer, wireless device, etc.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a head-mounted display device as an augmented reality device; however the head-mounted display device depicted herein is merely exemplary. Components can be configured for performing novel aspects of embodiments, where configured for comprises programmed to perform particular tasks or implement particular abstract data types using code. Further, while embodiments of the present invention may generally refer to the head-mounted display device and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for implementing three-dimensional (3D) resource integration, the system comprising:
   a 3D integration manager having a plurality of 3D resource controls, wherein each of the plurality of 3D resource controls is a defined set of instructions for integrating 3D resources with 3D objects, when operations are performed, for generating 3D-based graphical interfaces associated with operations of 2D-based features of an application and an operating system, wherein integrating the 3D resources alters the 2D-based features with 3D objects and 3D-based graphical interfaces;
   an application or operating system configured to:
   receive, within a 2D-based graphical interface, an indication to perform an operation associated with a 3D object from the 3D objects, wherein the operation is associated with a 2D-based feature of the application or the operating system that is performed differently based on integrated 3D resource controls, wherein the 3D object is a predefined 3D object assessable via a 3D object store;
   access, from the 3D integration manager, one or more of the 3D resource controls associated with the operation to support performing the operation, wherein the 3D integration manager comprises the one or more 3D resource controls associated with the application or the operating system for controlling 3D objects that are accessed via the 3D object store, wherein the one or more 3D resource controls are integrated with the 2D-based feature of the application or the operating system;
   receive, from the 3D integration manager, an input based on one or more control elements of the one or more 3D resource controls, wherein the input comprises the one or more control elements that operate to generate a 3D-based graphical interface for the operation; and
   based on the receiving the input, executing the operation based on the 3D resource integration manager providing the one or more 3D resource controls for the application or the operating system to control the 3D object associated with the one or more 3D resource controls and accessed via the 3D object store, wherein executing the operation comprises selectively modifying an existing 2D-based graphical interface of the 2D-based feature of the application or the operating system by integrating a portion of the existing 2D-based graphical interface with the 3D object and the 3D-based graphical interface for the operation, causing a functionality of the operation is executed with the integrated 3D object and the 3D-based graphical interface when the operation is selected for execution.

2. The system of claim 1, wherein one of the plurality of 3D resource controls is a file explorer 3D resource control with one or more control elements that operate to generate 3D-based graphical interfaces for accessing 3D objects via an application or an operating system.

3. The system of claim 2, wherein the file explorer 3D resource control generates the 3D-based graphical interface for the operation based on attributes of the 3D object and the application or operating system associated with the operation, wherein the 3D-based graphical interface comprises a file explorer control interface from which a plurality of 3D perspectives of the 3D object are displayed and 3D actions of the 3D object are directly performed.

4. The system of claim 2, wherein the operation is a drag and drop operation from a file explorer control interface to an application interface, wherein the 3D-based graphical interface comprises a 3D-based drag and drop animation of the 3D object across a desktop of the operating system from the file explorer control interface to the application interface.

5. The system of claim 2, wherein the file explorer 3D resource control with the one or more control elements operates to generate a selectable icon for an augmented reality control, the augmented reality control operates to transition from selecting the 3D object into an augmented reality control interface where the 3D object is viewable as a hologram in a real world environment.

6. The system of claim 1, wherein the operation and the 3D object are associated with a lock screen operating system feature, wherein the 3D object is integrated into the lock screen based on the 3D resource control, such that, based on user input at lock screen the 3D-based graphical interface is generated with the 3D object.

7. The system of claim 1, wherein the operation and the 3D object are associated with a desktop background operating system feature, wherein the 3D object is integrated into the desktop background based on the 3D resource control, such that, based on user input for the desktop background, the 3D-based graphical interface is generated with the 3D object.

8. The system of claim 1, wherein the operation and the 3D object are associated with an interactive functionality configured in authoring-mode for a presentation-authoring application in presentation mode, wherein the 3D object is integrated into the presentation-authoring application based on the 3D resource control, the 3D object executes the interactive functionality based on user input associated with interactive functionality.

9. The system of claim 1, wherein the operation and the 3D object are associated with a file explorer control interface and an application interface or an operating system interface, wherein the 3D object is integrated into the file explorer control interface and the application interface or operating system interface, such that, based on user input, the 3D-based graphical interface is generated comprising the 3D object transitioning from the file explorer control interface to the application interface or the operating system interface.

10. A computer-implemented method for implementing three-dimensional (3D) resource integration, the method comprising:
   receiving, within a 2D-based graphical interface, an indication to perform an operation associated with a 3D object from a plurality of 3D objects, wherein the operation is associated with a 2D-based feature of an application or an operating system that is performed differently based on integrated 3D resource controls, wherein the 3D object is a predefined 3D object accessible via a 3D object store;
   accessing, from a 3D integration manager, one or more of the 3D resource controls associated with the operation to support performing the operation, wherein the 3D integration manager comprises the one or more of the 3D resource controls associated with the application or the operating system for controlling 3D objects that are accessed via the 3D object store, wherein each of the 3D resource controls is a defined set of instructions for integrating 3D resources with the plurality of 3D objects, when operations are performed, for generating 3D-based graphical interfaces associated with operations of 2D-based application features and operating system features, the 3D resource controls are integrated with the 2D-based feature of the application or the operating system, wherein integrating the 3D resources alters 2D-based application features and operating system features with 3D objects and 3D-based graphical interfaces;

receiving an input based on one or more control elements of the one or more of the 3D resource controls, wherein the input comprises the one or more control elements that operate to generate a 3D-based graphical interface for the operation; and based on the receiving the input, executing the operation based on the 3D resource integration manager providing the one or more 3D resource controls for the application or the operating system to control the 3D object associated with the one or more 3D resource controls and accessed via the 3D object store, wherein the executing the operation comprises selectively modifying an existing 2D-based graphical interface of the 2D-based feature of the application or the operating system by integrating a portion of the existing 2D-based graphical interface with the 3D object and the 3D-based graphical interface for the operation, causing a functionality of the operation is executed with the integrated 3D object and the 3D-based graphical interface when the operation is selected for execution.

11. The method of claim 10, wherein the operation and the 3D object are associated with a lock screen operating system feature, wherein the 3D object is integrated into the lock screen based on the 3D resource control, such that, based on user input at lock screen the 3D-based graphical interface is generated with the 3D object.

12. The method of claim 10, wherein the operation and the 3D object are associated with a desktop background operating system feature, wherein the 3D object is integrated into the desktop background based on the 3D resource control, such that, based on user input for the desktop background, the 3D-based graphical interface is generated with the 3D object.

13. The method of claim 10, wherein the operation and the 3D object are associated with an interpolation functionality configured in authoring-mode for a presentation-authoring application in presentation mode, wherein the 3D object is integrated into the presentation-authoring application based on the 3D resource control, the 3D object, for each slide of the presentation-authoring application is associated with a selected 3D perspective from a plurality of 3D perspectives of the 3D object, such that, based on user input, 3D-based graphical interface is generated with the 3D object automatically interpolating between perspectives of corresponding slides.

14. The method of claim 10, wherein the operation is associated with an avatar feature of a chat application, wherein the 3D-based graphical interface comprises animating an avatar of the avatar feature based on functionality of the chat application.

15. The method of claim 10, wherein the 3D resource control is a file explorer 3D resource control that operates to generate 3D-based graphical interfaces for accessing 3D objects via an application or an operating system,
wherein the file explorer 3D resource control generates the 3D-based graphical interface for the operation based on attributes of the 3D objects and the application or the operating system associated with the operation, and
wherein the 3D-based graphical interface comprises a file explorer control interface from which 3D attributes of the 3D object are displayed and 3D actions of the 3D object are directly performed.

16. One or more computer storage media having computer-executable instructions embodied thereon that, when executed, by one or more processors, causes the one or more processors to perform a method for implementing three-dimensional (3D) resource integration, the method comprising:

initializing, with a 3D integration manager, a file explorer 3D resource control, wherein the file explorer 3D resource control is a defined set of instructions for integrating 3D resources with 3D objects, when operations are performed, for generating 3D-based graphical interfaces associated with the operations associated with a 2D-based feature of an application or an operating system, wherein integrating the 3D resources alters 2D-based application features and operating system features with the 3D objects and the 3D-based graphical interfaces, receiving, within a 2D-based graphical interface, an indication to perform an operation of an application or an operating system, associated with a 3D object from a plurality of 3D objects, wherein the 3D object is a predefined 3D object accessible via a 3D object store, determining that the file explorer 3D resource control is operable to generate a 3D-based graphical interface for the operation, wherein the operation is associated with the 2D-based feature of the application or the operating system that is performed differently based on the integrated 3D resource controls, wherein the 3D integration manager comprises the file explorer 3D resource control associated with the application or the operating system for controlling the plurality of 3D objects that are accessible via a 3D object store; and communicating, from the 3D integration manager, an input based on one or more control elements of the file explorer 3D resource control, wherein the input comprises the one or more control elements that operate to generate a 3D-based graphical interface for the operation, wherein the operation is executed based on the 3D resource integration manager providing the file explorer 3D resource control for the application or the operating system to control the 3D object associated with the file explorer 3D resource control and accessed via the 3D object store, wherein executing the operation comprises selectively modifying an existing 2D-based graphical interface of the 2D-based feature of the application or the operating system by integrating a portion of the existing 2D-based graphical interface with the 3D object and the 3D-based graphical interface for the operation, causing a functionality of the operation is executed with the integrated 3D object and the 3D-based graphical interface when the operation is selected for execution.

17. The media of claim 16, wherein the file explorer 3D resource control generates the 3D-based graphical interface for the operation based on attributes of the 3D objects and the application or the operating system associated with the operation, wherein the 3D-based graphical interface comprises a file explorer control interface from which 3D attributes of the 3D object are displayed and 3D actions of the 3D object are directly performed.

18. The media of claim 16, wherein the operation is a drag and drop operation from a file explorer control interface to an application interface, wherein the 3D-based graphical interface comprises a 3D-based drag and drop animation of the 3D object across a desktop of the operating system from the file explorer control interface to the application interface.

19. The media of claim 16, wherein the file explorer 3D resource control generates a selectable icon for an augmented reality control, the augmented reality control operates to transition from selecting the 3D object into an augmented reality control interface where the 3D object is viewable as a hologram in a real world environment.

20. The media of claim 16, wherein the operation and the 3D object are associated with a desktop background operating system feature, wherein the 3D object is integrated into the desktop background and wherein the file explorer 3D resource control generates a file explorer control interface within a personalization control interface for selecting 3D object for the desktop background.

\* \* \* \* \*